US007570290B2

(12) United States Patent
Yokota et al.

(10) Patent No.: US 7,570,290 B2
(45) Date of Patent: Aug. 4, 2009

(54) DRIVE METHOD FOR SOLID-STATE IMAGING DEVICE, SOLID-STATE IMAGING DEVICE, AND IMAGING APPARATUS

(75) Inventors: Kazuhide Yokota, Kanagawa (JP); Hisashi Kurebayashi, Kanagawa (JP); Kenji Tanaka, Tokyo (JP); Akira Matsui, Kanagawa (JP); Yutaka Yoneda, Kanagawa (JP); Seishin Asato, Chiba (JP); Takuya Chiba, Tokyo (JP); Ryota Kosakai, Tokyo (JP)

(73) Assignee: Sony Corporation, Tokyo (JP)

( * ) Notice: Subject to any disclaimer, the term of this patent is extended or adjusted under 35 U.S.C. 154(b) by 637 days.

(21) Appl. No.: 11/302,703

(22) Filed: Dec. 14, 2005

(65) Prior Publication Data

US 2006/0139469 A1 Jun. 29, 2006

(30) Foreign Application Priority Data

Dec. 27, 2004 (JP) ............................ P2004-375405
Apr. 4, 2005 (JP) ............................ P2005-107034
Apr. 4, 2005 (JP) ............................ P2005-107037

(51) Int. Cl.
*H04N 3/14* (2006.01)
*H04N 5/335* (2006.01)
*H04N 9/083* (2006.01)
*H01L 27/00* (2006.01)

(52) U.S. Cl. .................... 348/275; 348/315; 250/208.1; 257/291

(58) Field of Classification Search .............. 348/230.1, 348/274, 277–279, 317, 320, 322, 272, 273, 348/281, 290, 292, 302, 315; 257/291–292; 250/208.1, 214

See application file for complete search history.

(56) References Cited

U.S. PATENT DOCUMENTS 4,710,803 A * 12/1987 Suzuki et al. ............... 348/275

(Continued)

FOREIGN PATENT DOCUMENTS

JP          61-258594          11/1986

(Continued)

OTHER PUBLICATIONS

Japanese Office Action issued on Nov. 25, 2008.

(Continued)

*Primary Examiner*—Lin Ye
*Assistant Examiner*—Euel K Cowan
(74) *Attorney, Agent, or Firm*—Sonnenschein Nath & Rosenthal LLP

(57) ABSTRACT

A drive method for a solid-state imaging device having an oblique pixel pattern includes the steps of: adding, separately for an odd-numbered row and an even-numbered row, x pixels in the horizontal direction and y pixels in the vertical direction, the x pixels and the y pixels having the same color, in an area having adjacent n pixels in the horizontal direction and adjacent n pixels in the vertical direction, where n is an odd number of three or greater and n≧x≧y; and repeatedly adding the x pixels and the y pixels while shifting the n×n area by m pixels in the vertical or horizontal direction, where m is an odd number of three or greater. The n×n area of odd-numbered rows is displaced from that of even-numbered rows by m pixels in the oblique direction in the oblique pixel pattern.

7 Claims, 25 Drawing Sheets

U.S. PATENT DOCUMENTS

| | | | |
|---|---|---|---|
| 5,208,857 A * | 5/1993 | Lebrat | 380/217 |
| 5,251,019 A | 10/1993 | Moorman et al. | |
| 5,402,171 A * | 3/1995 | Tagami et al. | 348/219.1 |
| 5,592,575 A * | 1/1997 | Nakazato | 382/312 |
| 6,819,366 B2 * | 11/2004 | Suzuki et al. | 349/9 |
| 6,822,682 B1 * | 11/2004 | Kawajiri et al. | 348/315 |
| 6,882,364 B1 * | 4/2005 | Inuiya et al. | 348/252 |
| 6,999,119 B1 * | 2/2006 | Shibazaki et al. | 348/273 |
| 7,352,391 B1 * | 4/2008 | Hatakeyama | 348/223.1 |

FOREIGN PATENT DOCUMENTS

| | | |
|---|---|---|
| JP | 04-088784 | 3/1992 |
| JP | 5-505718 | 8/1993 |
| JP | 11-355790 | 12/1999 |
| JP | 11-355791 | 12/1999 |
| JP | 2002-209100 | 7/2002 |
| JP | 2002-369212 | 12/2002 |
| JP | 2003-060185 | 2/2003 |
| JP | 2004-312140 | 11/2004 |

OTHER PUBLICATIONS

Japanese Office Action issued on Dec. 2, 2008.

* cited by examiner

DRIVE METHOD FOR SOLID-STATE IMAGING DEVICE, SOLID-STATE IMAGING DEVICE, AND IMAGING APPARATUS

CROSS REFERENCES TO RELATED APPLICATIONS

The present invention contains subject matter related to Japanese Patent Application JP 2004-375405 filed in the Japanese Patent Office on Dec. 27, 2004, Japanese Patent Application JP 2005-107034 filed in the Japanese Patent Office on Apr. 4, 2005, and Japanese Patent Application JP 2005-107037 filed in the Japanese Patent Office on Apr. 4, 2005, the entire contents of which are incorporated herein by reference.

BACKGROUND OF THE INVENTION

1. Field of the Invention

The present invention relates to a drive method for a solid-state imaging device, a solid-state imaging device, and an imaging apparatus. More particularly, the invention relates to a drive method for an X-Y address solid-state imaging device, a typical example of which is a complementary metal-oxide semiconductor (CMOS) device image sensor, a solid-state imaging device implementing the above drive method, and an imaging apparatus using the solid-state imaging device.

The invention also pertains to a solid-state imaging apparatus and an imaging apparatus, and more particularly, to a solid-state imaging apparatus in which a color filter having a primary color component for generating luminance (Y) components and other color components is disposed on the surface of the pixels, and also to an imaging apparatus using the solid-state imaging apparatus as the imaging device.

2. Description of the Related Art

To improve the frame rate in a solid-state imaging device, generally, the amount of pixel information is decreased by adding information concerning a plurality of pixels, as disclosed in, for example, Japanese Unexamined Patent Application Publication No. 2004-266369.

An example of the above-described technique is as follows. In color coding of a Bayer pattern shown in FIG. 1, from a 3×3 pixel area, the same color of pixels in the two columns and the two rows are extracted and added while shifting the 3×3 pixel area by three pixels by maintaining the original pixel pattern without changing the color spatial repeat pattern or changing the pixel pitch ratio in the vertical, horizontal, and oblique directions.

Red (R) pixels 311, 313, 331, and 333 located in the odd-numbered rows are added, and then, the resulting addition R signal is positioned at centroid A. Similarly, by horizontally shifting three pixels from the R pixels 311, 313, 331, and 333, green (G) pixels 314, 316, 334, and 336 are added, and then, the resulting addition G signal is positioned at centroid B. By further horizontally shifting three pixels from the G pixels 314, 316, 334, and 336, R signals 317, 319, 337, and 339 are added, and then, the resulting addition R signal is positioned at centroid C.

Then, by vertically shifting three pixels from the R pixels 311, 313, 331, and 333, G pixels 341, 343, 361, and 363 located in the even-numbered rows are added, and then, the resulting addition G signal is positioned at centroid D. By horizontally shifting three pixels from the G pixels 341, 343, 361, and 363, blue (B) pixels 344, 346, 364, and 366 are added, and then, the resulting addition B signal is positioned at centroid E. In this manner, by adding color pixels as described above over the entire pixel area, the same colors of pixels can be added while maintaining the original color pattern without changing the color spatial repeat pattern or changing the pixel pitch ratio in the vertical, horizontal, and oblique directions.

In imaging apparatuses, such as in digital still cameras and video cameras, the number of pixels of solid-state imaging apparatuses used as imaging devices is increasing, and solid-state imaging apparatuses having several millions of pixels are coming into widespread use. The use of multi-pixel imaging devices aims to obtain high-resolution images. However, there is still a demand for solid-state imaging apparatuses exhibiting higher resolution.

In single-panel digital cameras, the color pattern of a color filter used in a solid-state imaging apparatus is very important to obtain high resolution. A typical example of the color pattern is the known, widely used Bayer pattern.

Bayer Pattern

The Bayer pattern is a color pattern, as shown in FIG. 2, in which a GR line having G pixels and R pixels alternately and a GB line having G pixels and B pixels alternately are disposed alternately in the horizontal direction (also in the vertical direction). The feature of this Bayer pattern is that the pixels are disposed in a square lattice at regular intervals d (pixel pitches) of the pixels in the vertical and horizontal directions and that the ratio G:R:B of the GRB colors in this square lattice pattern is 2:1:1.

The spatial frequency characteristics of the RGB colors in the Bayer pattern are now described by separately considering the characteristics of the G color, which is the primary color for generating luminance (Y) components, and the other colors, i.e., the R and B colors.

Generally, the luminance signal Y is generated according to equation (1).

$$Y=0.6G+0.3R+0.1B. \qquad (1)$$

Equation (1) is based on the fact that the human eye is more sensitive to the G color and less sensitive to the R and B colors. That is, if high resolution is necessary for the luminance (Y) components, it is very important to increase the resolution of the G color components, and not very high resolution is necessary for the other R and B color components.

FIGS. 3A and 3B illustrate the G pattern from which only G pixels are extracted from the Bayer pattern. The spatial frequency characteristics are now considered with reference to FIGS. 3A and 3B. If the pixel sampling rate is set to be the pixel pitch d, the sampling rate for the G pixels is equal to the pixel pitch d in the vertical and horizontal directions, and according to the sampling theorem, signal components having frequencies up to $(1/2)fs$ (fs (=1/d): sampling frequency) can be collected. That is, it is possible to collect signal components indicated by the half-tone columns and the voided columns shown in FIG. 3A according to the theoretical threshold and it is not possible to collect signal components having higher frequencies beyond this threshold frequency.

Concerning the 45° oblique direction, since the sampling rate for the G pixels is $d/\sqrt{2}$, signal components up to $(1/2\sqrt{2})fs$ can be collected according to the sampling theorem.

Similarly, the spatial frequency characteristics of the R and B pixels are considered below. In this case, since the pixel pitches for the R and B pixels are the same, only the spatial frequency characteristics of the R pixels are described below.

The R pattern from which only the R pixels are extracted from the Bayer pattern is shown in FIGS. 3C and 3D. Concerning the spatial frequency characteristics of the R pixels, since the sampling rate for the R pixels is 2d in the vertical and horizontal directions, signal components having frequencies up to 1/4fs can be collected according to the sampling theorem. In the oblique direction, the sampling rate for the R pixels is d/√2, and thus, signal components having frequencies up to (1/2√2)fs can be collected according to the sampling theorem.

In FIGS. 3A through 3D, threshold frequency components that can be collected in the vertical, horizontal, and oblique directions are indicated by the voided columns and half-tone columns.

The spatial frequency characteristics of the G, R, and B pixels are shown in FIG. 4. FIG. 4 shows that, when the sampling rate is set to be the pixel pitch d (=1/fs), the spatial frequency characteristics of the G pixels exhibit the resolution up to 1/2fs in the vertical and horizontal directions and up to (1/2√2)fs in the oblique 45° direction and the spatial frequency characteristics of the R pixels exhibit the resolution up to 1/4fs in the vertical and horizontal directions and up to (1/2√2)fs in the oblique 45°direction, i.e., signal components up to the above-described threshold frequency can be collected.

Bayer Pixel Shifted Pattern

In addition to the above-described Bayer pattern, the pattern shifted by 45° from the Bayer pattern shown in FIGS. 3A through 3D, such as the pattern shown in FIGS. 6A through 6D, that is, a modified Bayer pattern in which pixels are disposed by being shifted by half the pixel pitch in the vertical and horizontal directions, has been proposed, as disclosed in Japanese Unexamined Patent Application Publication No. 10-262260.

The color pattern generated by shifting the Bayer pattern by 45° is hereinafter referred to as the "Bayer pixel shifted pattern". In this Bayer pixel shifted pattern, since the sampling rate results in d/√2, which is 1/√2 times as high as the sampling rate d of the Bayer pattern, higher resolution can be obtained compared to that of the Bayer pattern.

From another point of view, if the same resolution is required in the Bayer pattern and in the Bayer pixel shifted pattern, the sampling rate of the Bayer pixel shifted pattern can be increased by √2 as large as that of the Bayer pattern. In other words, by using the Bayer pixel shifted pattern, the same resolution can be obtained with a smaller number of pixels than that in the Bayer pattern. As a result, the pixel aperture can be increased so that the photo-sensitivity of the pixels can be enhanced, thereby obtaining signals having a high signal-to-noise (S/N) ratio.

However, the Bayer pixel shifted pattern can exhibit high resolution only for achromatic subjects. The reason for this is as follows.

FIG. 5 illustrates color coding of the Bayer pixel shifted pattern.

The G pattern from which only the G pixels are extracted from the Bayer pixel shifted pattern is shown FIGS. 6A and 6B. Since the sampling rate for the G pixels in the vertical and horizontal directions is √2d, which is larger than the sampling rate d for the G pixels in the vertical and horizontal directions in the Bayer pattern, the resolution in the Bayer pixel shifted pattern is lower than that in the Bayer pattern. On the other hand, since the sampling rate d for the G pixels in the 45° oblique direction is smaller than the sampling rate d/√2 in the 45°oblique direction in the Bayer pattern, the resolution is higher than that in the Bayer pattern.

Similarly, the resolution of the R pixels and the B pixels is considered. Since the pixel pitches for the R pixels and the B pixels are the same, only the resolution of the R pixels is described below.

The R pattern from which only the R pixels are extracted from the Bayer pixel shifted pattern is shown in FIGS. 6C and 6D. The sampling rate for the R pixels in the vertical and horizontal directions is √2d, and the sampling rate for the R pixels in the oblique direction is 2d.

In FIGS. 6A through 6D, threshold frequency components that can be collected in the vertical, horizontal, and oblique directions are indicated by the voided columns and half-tone columns.

The spatial frequency characteristics of the G, R, and B pixels are shown in FIG. 7. Upon comparing FIG. 7 with FIG. 4, it is seen that the spatial frequency characteristics of the Bayer pixel shifted pattern are the same as those shifted from the spatial frequency characteristics of the Bayer pattern by 45°.

SUMMARY OF THE INVENTION

To enhance the effective integrity of pixels including photoelectric transducers, some solid-state imaging devices use the following so-called "oblique pixel pattern". In this oblique pixel pattern, from a matrix pixel pattern, even-numbered column pixels are displaced from odd-numbered column pixels in the column direction by about 1/2 the pixel pitch and even-numbered row pixels are displaced from odd-numbered row pixels in the row direction by about 1/2 the pixel pitch. When a color filter is disposed on a solid-state imaging device having this oblique pixel pattern, the color coding of the Bayer pattern is shifted by 45°, as shown in FIG. 8.

In a CMOS image sensor having an oblique pixel pattern, when line-sequentially reading pixel signals, in a pixel region 101 in which pixels 100 are obliquely disposed, as shown in FIG. 9, a horizontal pixel drive line group 105, each drive line being connected to the pixels 100 in the two zigzag lines, is driven by a vertical selection circuit 106, and signals of the pixels 100 of the selected zigzag lines via the horizontal pixel drive line group 105 are stored in column processing circuits 103, each being disposed for one column, via a vertical signal line group 102, each vertical signal line being disposed for one pixel column. The signals of the pixels 100 stored in the column processing circuits 103 are then sequentially read out to a horizontal signal line 108 via a horizontal selection switch group 107, the switches being sequentially selected by a horizontal selection circuit 104.

In this reading method, the reading speed is fast since many pixel signals can be read out by one reading operation, but on the other hand, it is necessary that the pixel signals in two adjacent rows be read out at the same time, which is less flexible. Accordingly, when performing the pixel addition in the color coding of the oblique pixel pattern shown in FIG. 8 generated by shifting the Bayer pattern by 45°, unlike the pixel addition in the color coding in the Bayer pattern, the resulting color pattern of the added signals becomes different from the original color pattern while finding it difficult to maintain the same color spatial repeat pattern and the same pitch ratio in the vertical, horizontal, and oblique directions.

In another reading method in a CMOS image sensor having an oblique pixel pattern, as shown in FIG. 10, in a pixel region 201 in which pixels 200 are obliquely disposed, a horizontal pixel drive line group 205, each pixel drive line being disposed for one pixel row, is driven by a vertical selection circuit 206, and signals of the pixels 200 of the selected rows via the horizontal pixel drive line group 205 are stored in column processing circuits 203, each being disposed for two zigzag columns, via the vertical signal line group 202, each signal line being connected to the pixels 200 in the same two zigzag columns. The signals of the pixels 200 stored in the column processing circuits 203 are then sequentially read out to a horizontal signal line 208 via a horizontal switch group 207, the switches being sequentially selected by a horizontal selection circuit 204.

In this reading method, it is difficult to implement the fast reading operation since pixel signals can be read out only line by line. Additionally, the pixel signals in the adjacent odd-numbered row and even-numbered row are read out via the same vertical signal line in the vertical signal line group 202 and are processed in the same column circuit 203. Thus, when performing the pixel addition in the color coding of the pixel pattern shown in FIG. 8 shifted from the Bayer pattern by 45°, the resulting color pattern of the added signals becomes different from the original color pattern while finding it difficult to maintain the same color spatial repeat pattern and the same pitch ratio in the vertical, horizontal, and oblique directions.

Differences between the Bayer pixel shifted pattern and the Bayer pattern, which is a typical example of known color patterns, are described below.

In the Bayer pixel shifted pattern, since the sampling rate is $1/\sqrt{2}$ times as large as that of the Bayer pattern, pixel information twice as much as that of the Bayer pattern can be obtained as long as the Bayer pixel shifted pattern is used for achromatic subjects. That is, higher resolution can be obtained in the Bayer pixel shifted pattern. In other words, the use of the Bayer pixel shifted pattern exhibits the same resolution as that of the Bayer pixel with a smaller number of pixels, which makes it possible to increase the aperture of the pixels, thereby increasing the pixel photo-sensitivity, i.e., the S/N ratio.

In terms of only the G pixels, which are primary components for generating luminance (Y) components, the sampling rate of the Bayer pixel shifted pattern in the vertical and horizontal directions is larger than that of the Bayer pattern. This means that the resolution of the G pixels in the Bayer pattern in the vertical and horizontal directions is higher than that of the Bayer pixel shifted pattern. In other words, as far as the resolution of the G pixels in the vertical and horizontal directions is concerned, the Bayer pixel shifted pattern is inferior to the Bayer pattern.

To overcome this point, when imaging an achromatic subject, the RGB balance is adjusted in a camera signal processing system, i.e., a gain is applied so that the RGB levels become the same. Then, luminance (Y) components are generated, assuming that the R and B levels are equal to the G level, and the sampling rate of the Y components is handled as $(1/\sqrt{2})d$, thereby implementing higher resolution than the Bayer pattern in all the vertical, horizontal, and 45° oblique directions.

However, the above-described processing is effective only for achromatic subjects, and if the same processing is performed on chromatic subjects, it is difficult to obtain high resolution. Additionally, when the level balance is deviated, if the processing is performed assuming that the R and B levels are equal to the G level, it is difficult to perform correct interpolation processing in the camera signal processing system, resulting in the occurrence of false colors.

In view of the above-described background, it is desirable to provide a drive method for a solid-state imaging device, a solid-state imaging device, and an imaging apparatus in which, after adding pixels in an oblique pixel pattern, the original color pattern can be maintained without changing the color spatial repeat pattern or the pitch ratio in the vertical, horizontal, and oblique directions.

It is also desirable to provide a solid-state imaging apparatus and an imaging apparatus that achieve high resolution both for achromatic subjects and chromatic subjects without causing false colors.

According to an embodiment of the present invention, there is provided a drive method for a solid-state imaging device having an oblique pixel pattern in which pixels are obliquely disposed. The drive method includes the steps of: adding, separately for an odd-numbered row and an even-numbered row, x pixels in the horizontal direction and y pixels in the vertical direction, the x pixels and the y pixels having the same color, in an area having adjacent n pixels in the horizontal direction and adjacent n pixels in the vertical direction, where n is an odd number of three or greater and $n \geq x \geq y$; and repeatedly adding the x pixels in the horizontal direction and the y pixels in the vertical direction while shifting the area having the adjacent n pixels in the horizontal direction and the adjacent n pixels in the vertical direction by m pixels in the vertical or horizontal direction, where m is an odd number of three or greater. The spatial positional relationship between the area having the adjacent n pixels in the horizontal direction and the adjacent n pixels in the vertical direction of odd-numbered rows and the area having the adjacent n pixels in the horizontal direction and the adjacent n pixels in the vertical direction of even-numbered rows are such that they are displaced from each other by m pixels in an oblique direction in the oblique pixel pattern.

By adding pixels as described above, the original color pattern can be maintained without changing the color spatial repeat pattern or the pitch ratio in the vertical, horizontal, and oblique directions.

According to another embodiment of the present invention, there is provided a solid-state imaging apparatus including pixels including photoelectric transducers disposed two-dimensionally in a matrix, and a color filter including primary color components, which are primary components for generating luminance components, and other color components, the color filter being disposed on a surface of the pixels. The primary color components and the other color components are disposed such that the primary color components surround the other color components. This solid-state imaging apparatus can be used as an imaging device in an imaging apparatus, such as a digital still camera or a video camera.

The above-configured solid-state imaging apparatus or an imaging apparatus using the solid-state imaging apparatus as the imaging device has a color pattern in which color components, for example, G color components, which are primary components for generating luminance components, surround other color components, for example, R and B color components. In this color pattern, the G components are present in all rows and all columns. Accordingly, the spatial frequency characteristics of the G components having higher sensitivity for the human eye can be increased, and the processing for adjusting the level balance of RGB components becomes unnecessary.

According to an embodiment of the present invention, in a solid-state imaging device having an oblique pixel pattern, after adding pixels, the original color pattern can be maintained without changing the color spatial repeat pattern or the pitch ratio in the vertical, horizontal, and oblique directions. As a result, by spatially equal sampling, high-quality added signals can be obtained. At the same time, the added signals can be output in the same color pattern as that obtained by a progressive (all-pixel) reading method for independently reading pixel signals, thereby facilitating the signal processing in the subsequent stage.

Also, the spatial frequency characteristics of the color components, which are the primary components for generating luminance components, can be increased. Thus, high resolution can be achieved, not only for achromatic color subjects, but also for chromatic color subjects. Additionally, the processing for adjusting the level balance for RGB pixels becomes unnecessary, thereby preventing the occurrence of false colors.

DESCRIPTION OF THE PREFERRED EMBODIMENTS

Embodiments of the present invention are described in detail below with reference to the accompanying drawings.

Drive methods for performing pixel addition in solid-state imaging devices are discussed below through illustration of first through fifth embodiments.

It is now assumed that solid-state imaging devices using the drive methods discussed below have the following oblique pixel pattern. In this pixel pattern, many pixels including photoelectric transducers are disposed in a matrix, and the even-numbered column pixels are displaced from the odd-numbered column pixels in the column direction by about 1/2 the pixel pitch, and the even-numbered row pixels are displaced from the odd-numbered row pixels in the row direction by about 1/2 the pixel pitch.

In the following embodiments of the present invention, in a solid-state imaging apparatus, pixels including photoelectric transducers are two-dimensionally disposed, and a color filter having color components, which are primary color components for generating luminance (Y) components, and other colors is disposed on the surface of the pixels. In this solid-state imaging apparatus, the color pattern of the color filter is very important.

Accordingly, in the following three embodiments, the color patterns of color filters are principally described. The solid-state imaging apparatus having a color filter according to each of the three embodiments may be a charge-transfer solid-state imaging apparatus, a typical example of which is a charge-coupled device (CCD) solid-state imaging apparatus, or an X-Y address solid-state imaging apparatus, a typical example of which is a MOS solid-state imaging apparatus.

In the following description, it is assumed that, in a color filter, color components, which are primary colors for generating luminance (Y) components, are G components, and other color components are R and B components.

However, in the present invention, those color components are examples only, and white, cyan, and yellow components, for example, may be used as the primary colors for generating Y components, and magenta, cyan, and yellow components, for example, may be used as the other color components.

In the above-described solid-state imaging device having an oblique pixel pattern, image addition can be performed while maintaining the original color pattern without changing the color spatial repeat pattern or the pitch ratio in the vertical, horizontal, and oblique directions. This is described in detail below.

First Embodiment

Figure 11:
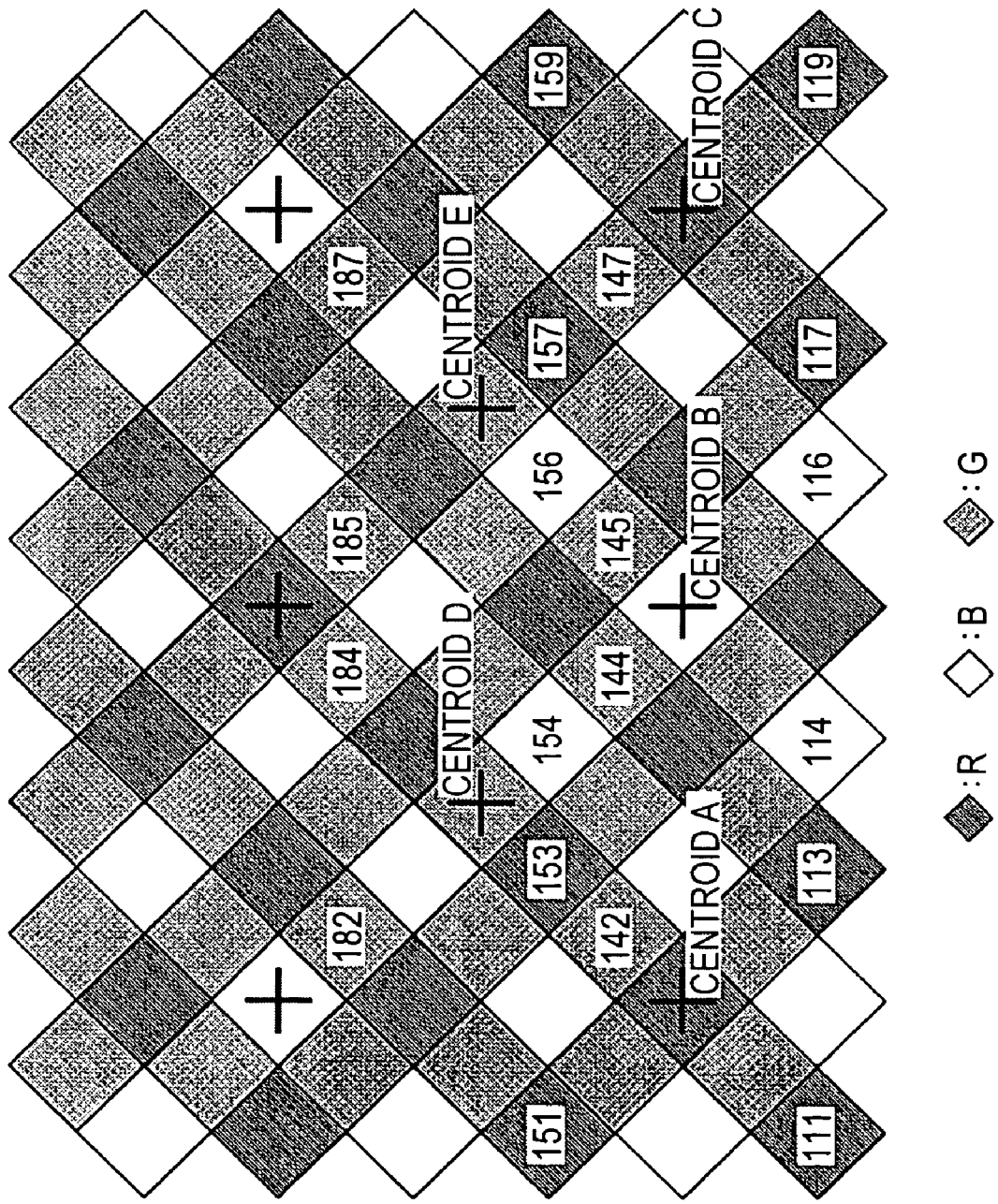
FIG. 11 illustrates the concept of adding pixels by a drive method according to a first embodiment of the present invention.

FIG. 11 illustrates the concept of adding pixels by a drive method according to a first embodiment of the present invention. In the color coding of a pixel pattern shifted from the Bayer pattern by 45° in accordance with the oblique pixel pattern, from a 3×3 pixel area, the same color of pixels in the two columns and two rows are extracted and added while shifting the 3×3 pixel area by three pixels, i.e., in units of three pixels. The process of such pixel addition is specifically discussed below.

In FIG. 11, R pixels 111, 113, 151, and 153 located in the odd-numbered rows are added, and then, the resulting addition R signal is positioned at centroid A. Similarly, by horizontally shifting three pixels from the R pixels 111, 113, 151, and 153, B pixels 114, 116, 154, and 156 are added, and then, the resulting addition B signal is positioned at centroid B. By further horizontally shifting three pixels from the B pixels 114, 116, 154, and 156, R signals 117, 119, 157, and 159 are added, and then, the resulting addition R signal is positioned at centroid C.

By obliquely shifting three pixels from the R signals 117, 119, 157, and 159, G pixels 142, 144, 182, and 184 located in the even-numbered rows are added, and the resulting addition G signal is positioned at centroid D. By horizontally shifting three pixels from the G pixels 142, 144, 182, and 184, G pixels 145, 147, 185, and 187 are added, and then, the resulting addition G signal is positioned at centroid E.

In this manner, by adding color pixels as described above over the entire pixel area, the same colors of pixels can be added while maintaining the original color pattern without changing the color spatial repeat pattern or the pitch ratio in the vertical, horizontal, and oblique directions. In the oblique pixel pattern, it is necessary that a column number corresponding to pixels of odd-numbered rows be different from that corresponding to pixels of even-numbered rows. As a result, by spatially equal sampling, high-quality added signals can be obtained. At the same time, the added signals can be output in the same color pattern as that obtained by a progressive (all-pixel) reading method for independently reading pixel signals, thereby facilitating the signal processing in the subsequent stage.

Second Embodiment

Figure 12:
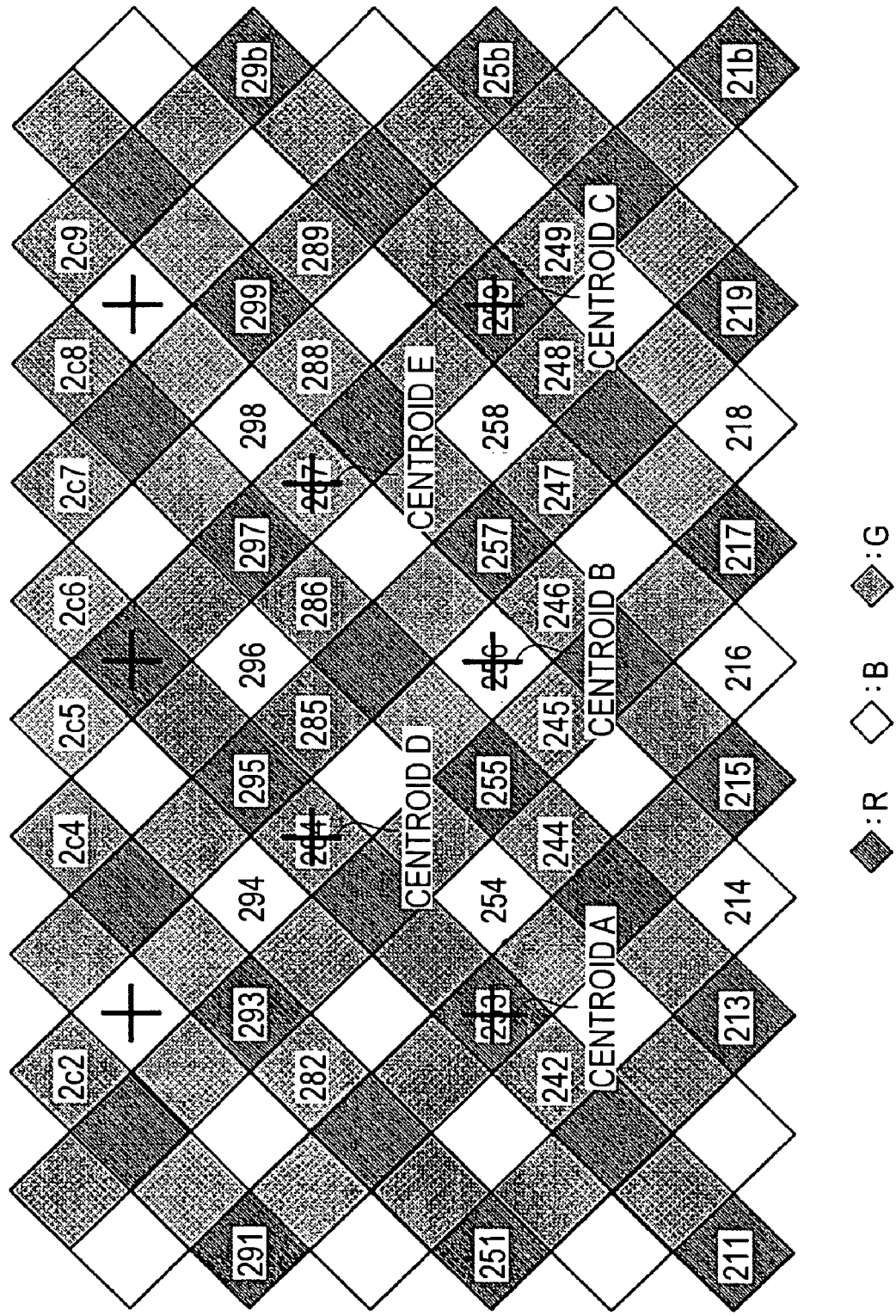
FIG. 12 illustrates the concept of adding pixels by a drive method according to a second embodiment of the present invention.

FIG. 12 illustrates the concept of adding pixels by a drive method according to a second embodiment of the present invention. In the color coding of a pixel pattern shifted from the Bayer pattern by 45° in accordance with the oblique pixel pattern, from a 5×5 pixel area, the same color of pixels in the three columns and three rows are extracted and added while shifting the 5×5 pixel area by three pixels. The process of such pixel addition is specifically discussed below.

In FIG. 12, R pixels 211, 213, 215, 251, 253, 255, 291, 293, and 295 located in the odd-numbered rows are added, and then, the resulting addition R signal is positioned at centroid A. By horizontally shifting three pixels from the R pixels 211, 213, 215, 251, 253, 255, 291, 293, and 295, B pixels 214, 216, 218, 254, 256, 258, 294, 296, and 298 are added, and then, the resulting addition B signal is positioned at centroid B. By further horizontally shifting three pixels from the B pixels 214, 216, 218, 254, 256, 258, 294, 296, and 298, R pixels 217, 219, 21b, 257, 259, 25b, 297, 299, and 29b are added, and then, the resulting addition R signal is positioned at centroid C.

By obliquely shifting three pixels, G pixels 242, 244, 246, 282, 284, 286, 2c2, 2c4, and 2c6 located in the even-numbered rows are added, and the resulting addition G signal is positioned at centroid D. By horizontally shifting three pixels from the G pixels 242, 244, 246, 282, 284, 286, 2c2, 2c4, and 2c6, G pixels 245, 247, 249, 285, 287, 289, 2c5, 2c7, and 2c9 are added, and then, the resulting addition G signal is positioned at centroid E.

In this manner, by adding color pixels as described above over the entire pixel area, the same colors of pixels can be added while maintaining the original color pattern without changing the color spatial repeat pattern or the pitch ratio in the vertical, horizontal, and oblique directions. As a result, by spatially equal sampling, high-quality added signals can be obtained. At the same time, the added signals can be output in the same color pattern as that obtained by a progressive reading method for independently reading pixel signals, thereby facilitating the signal processing in the subsequent stage.

Third Embodiment

Figure 13:
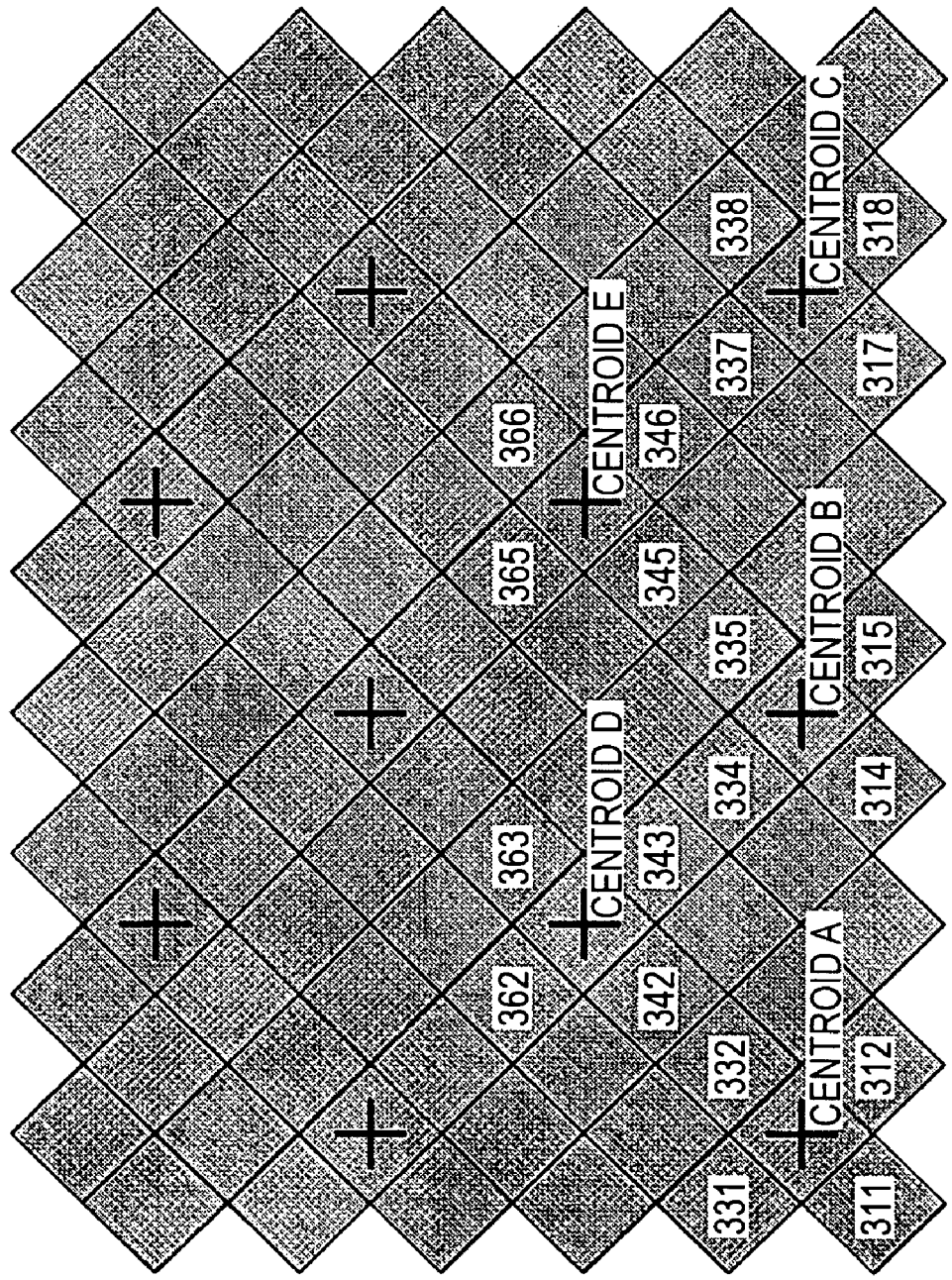
FIG. 13 illustrates the concept of adding pixels by a drive method according to a third embodiment of the present invention.

FIG. 13 illustrates the concept of adding pixels by a drive method according to a third embodiment of the present invention. In the oblique pixel pattern without a color filter, from a 3×3 pixel area, adjacent pixels in the two columns and two rows are extracted and added while shifting the 3×3 pixel area by three pixels. The process of such pixel addition is specifically discussed below.

In FIG. 13, pixels 311, 312, 331, and 332 located in the odd-numbered rows are added, and then, the resulting added signal is positioned at centroid A. By horizontally shifting three pixels from the pixels 311, 312, 331, and 332, pixels 314, 315, 334, and 335 are added, and then, the resulting added signal is positioned at centroid B. By further shifting three pixels from the 314, 315, 334, and 335, pixels 317, 318, 337, and 338 are added, and the resulting added signal is positioned at centroid C.

Then, by obliquely shifting three pixels, pixels 342, 343, 362, and 363 located in the even-numbered rows are added, and then, the resulting added signal is positioned at centroid D. By horizontally shifting three pixels from the pixels 342, 343, 362, and 363, pixels 345, 346, 365, and 366 are added, and the resulting added signal is positioned at centroid E.

In this manner, by adding pixels as described above over the entire pixel area, the pixels can be added while maintaining the original pattern without changing the pitch ratio in the vertical, horizontal, and oblique directions. As a result, by spatially equal sampling, high-quality added signals can be obtained. At the same time, the added signals can be output in the same pattern as that obtained by a progressive reading method for independently reading pixel signals, thereby facilitating the signal processing in the subsequent stage.

Fourth Embodiment

Figure 14:
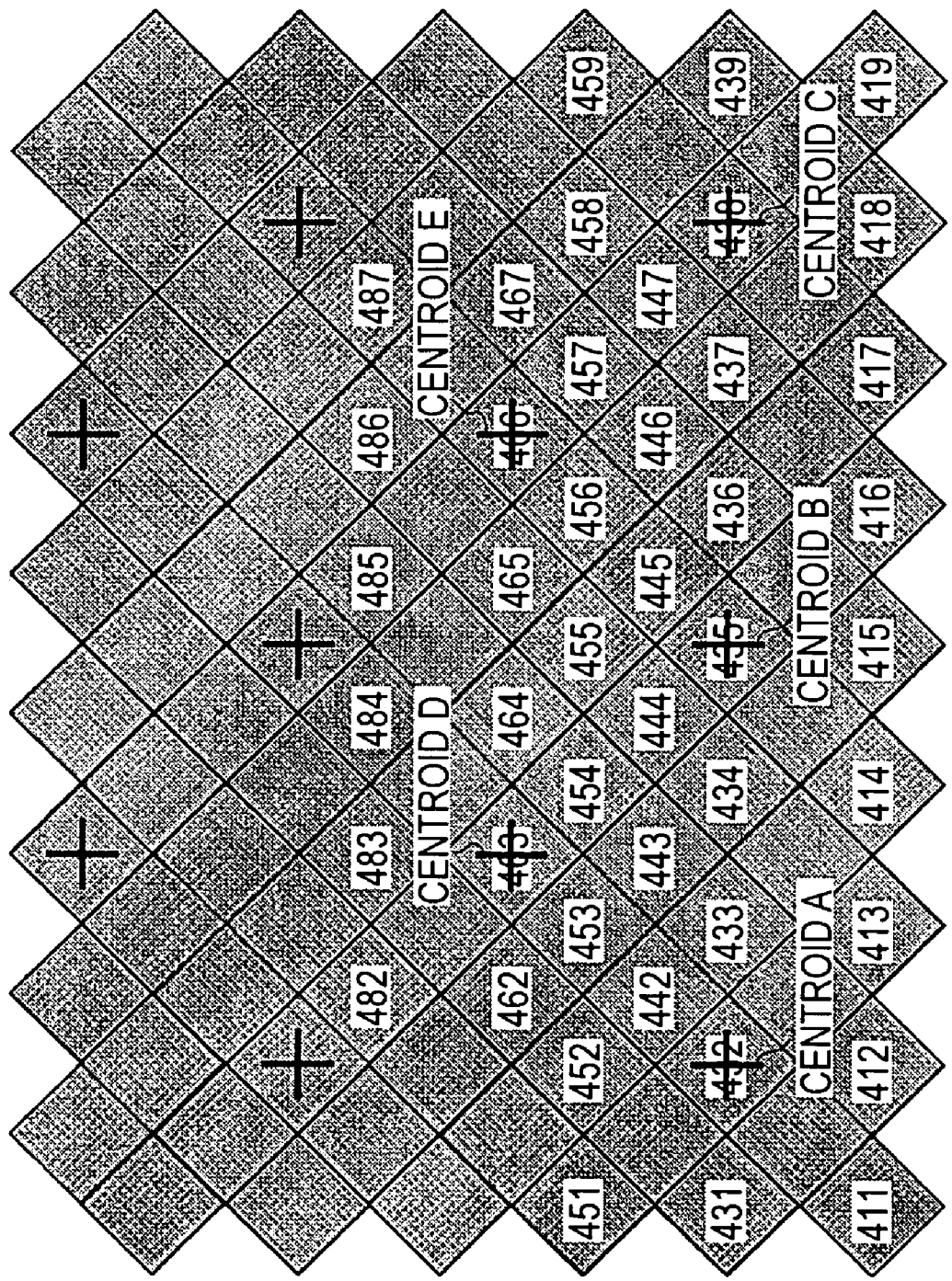
FIG. 14 illustrates the concept of adding pixels by a drive method according to a fourth embodiment of the present invention.

FIG. 14 illustrates the concept of adding pixels by a drive method according to a fourth embodiment of the present invention. In the oblique pixel pattern without a color filter, from a 3×3 pixel area, adjacent pixels in the three columns and three rows are extracted and added while shifting the 3×3 pixel area by three pixels. The process of such pixel addition is specifically discussed below.

In FIG. 14, pixels 411, 412, 413, 431, 432, 433, 451, 452, and 453 located in the odd-numbered rows are added, and then, the resulting added signal is positioned at centroid A. By horizontally shifting three pixels from the pixels 411, 412, 413, 431, 432, 433, 451, 452, and 453, pixels 414, 415, 416, 434, 435, 436, 454, 455, and 456 are added, and then, the resulting added signal is positioned at centroid B. By further shifting three pixels from the 414, 415, 416, 434, 435, 436, 454, 455, and 456, pixels 417, 418, 419, 437, 438, 439, 457, 458, and 459 are added, and the resulting added signal is positioned at centroid C.

Then, by obliquely shifting three pixels, pixels 442, 443, 444, 462, 463, 464, 482, 483, and 484 located in the even-numbered rows are added, and then, the resulting added signal is positioned at centroid D. By horizontally shifting three pixels from the pixels 442, 443, 444, 462, 463, 464, 482, 483, and 484, pixels 445, 446, 447, 465, 466, 467, 485, 486, and 487 are added, and the resulting added signal is positioned at centroid E.

In this manner, by adding pixels as described above over the entire pixel area, the pixels can be added while maintaining the original pattern without changing the pitch ratio in the vertical, horizontal, and oblique directions. As a result, by spatially equal sampling, high-quality added signals can be obtained. At the same time, the added signals can be output in the same pattern as that obtained by a progressive reading method for independently reading pixel signals, thereby facilitating the signal processing in the subsequent stage.

Fifth Embodiment

Figure 15:
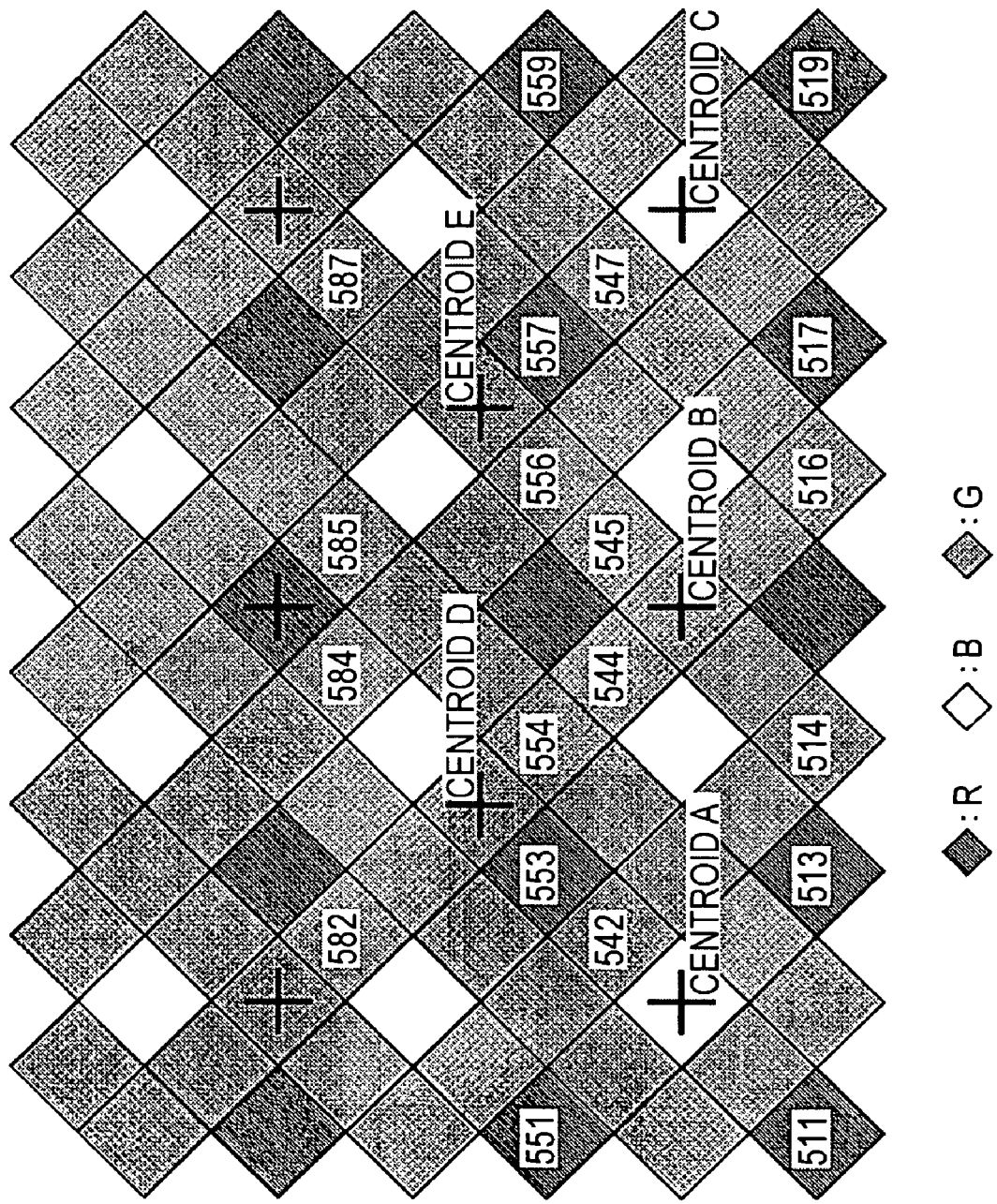
FIG. 15 illustrates the concept of adding pixels by a drive method according to a fifth embodiment of the present invention.

FIG. 15 illustrates the concept of adding pixels by a drive method according to a fifth embodiment of the present invention. In specific color coding as an example of special color coding, from a 5×5 pixel area, the same color of pixels in the two columns and two rows are extracted and added while shifting the 5×5 pixel area by three pixels. The process of such pixel addition is specifically discussed below.

In FIG. 15, R pixels 511, 513, 551, and 553 located in the odd-numbered rows are added, and then, the resulting addition R signal is positioned at centroid A. Similarly, by horizontally shifting three pixels from the R pixels 511, 513, 551, and 553, G pixels 514, 516, 554, and 556 are added, and then, the resulting addition G signal is positioned at centroid B. By further horizontally shifting three pixels from the G pixels 514, 516, 554, and 556, R signals 517, 519, 557, and 559 are added, and then, the resulting addition R signal is positioned at centroid C.

By obliquely shifting three pixels, G pixels 542, 544, 582, and 584 located in the even-numbered rows are added, and the resulting addition G signal is positioned at centroid D. By horizontally shifting three pixels from the G pixels 542, 544, 582, and 584, G pixels 545, 547, 585, and 587 are added, and then, the resulting addition G signal is positioned at centroid E.

In this manner, by adding color pixels as described above over the entire pixel area, the same colors of pixels can be added while maintaining the original color pattern without changing the color spatial repeat pattern or the pitch ratio in the vertical, horizontal, and oblique directions. As a result, by spatially equal sampling, high-quality added signals can be obtained. At the same time, the added signals can be output in the same color pattern as that obtained by a progressive reading method for independently reading pixel signals, thereby facilitating the signal processing in the subsequent stage.

Basic Form

The drive methods for adding pixels by using various patterns have been discussed through the first through fifth embodiments. A generalized form of adding pixels is described below.

In a solid-state imaging device including a pixel area (pixel array) having an oblique pixel pattern, in an $n^2$ area of adjacent n×n pixels (n is an odd number of three or greater), the same colors of pixels in the x columns and y ($n \geq x \geq y$) rows are extracted and added while shifting the n×n area by m pixels (m is an odd number of three or greater) in the vertical or horizontal direction. In this case, the pixels are added for odd-numbered rows and even-numbered rows separately. In this case, the spatial positional relationship between adjacent pixels in adjacent n×n pixels in the odd-numbered rows and those in the even-numbered rows are such that they are displaced from each other by m pixels in the oblique direction.

According to the drive method for performing the above-described pixel addition, pixels can be added while maintaining the original color pattern without changing the color spatial repeat pattern or the pitch ratio in the vertical, horizontal, and oblique directions.

As a result, by spatially equal sampling, high-quality added signals can be obtained. At the same time, the added signals can be output in the same pattern as that obtained by a progressive reading method for independently reading pixel signals, thereby facilitating the signal processing in the subsequent stage. Additionally, since $n \geq x \geq y$, it is not necessary to add sample-and-hold capacitors for adding pixels, as described below.

Solid-State Imaging Device

A description is now given of an example of the configuration of a solid-state imaging device that implements the drive methods for adding pixels according to the first through fifth embodiments.

Figure 16:
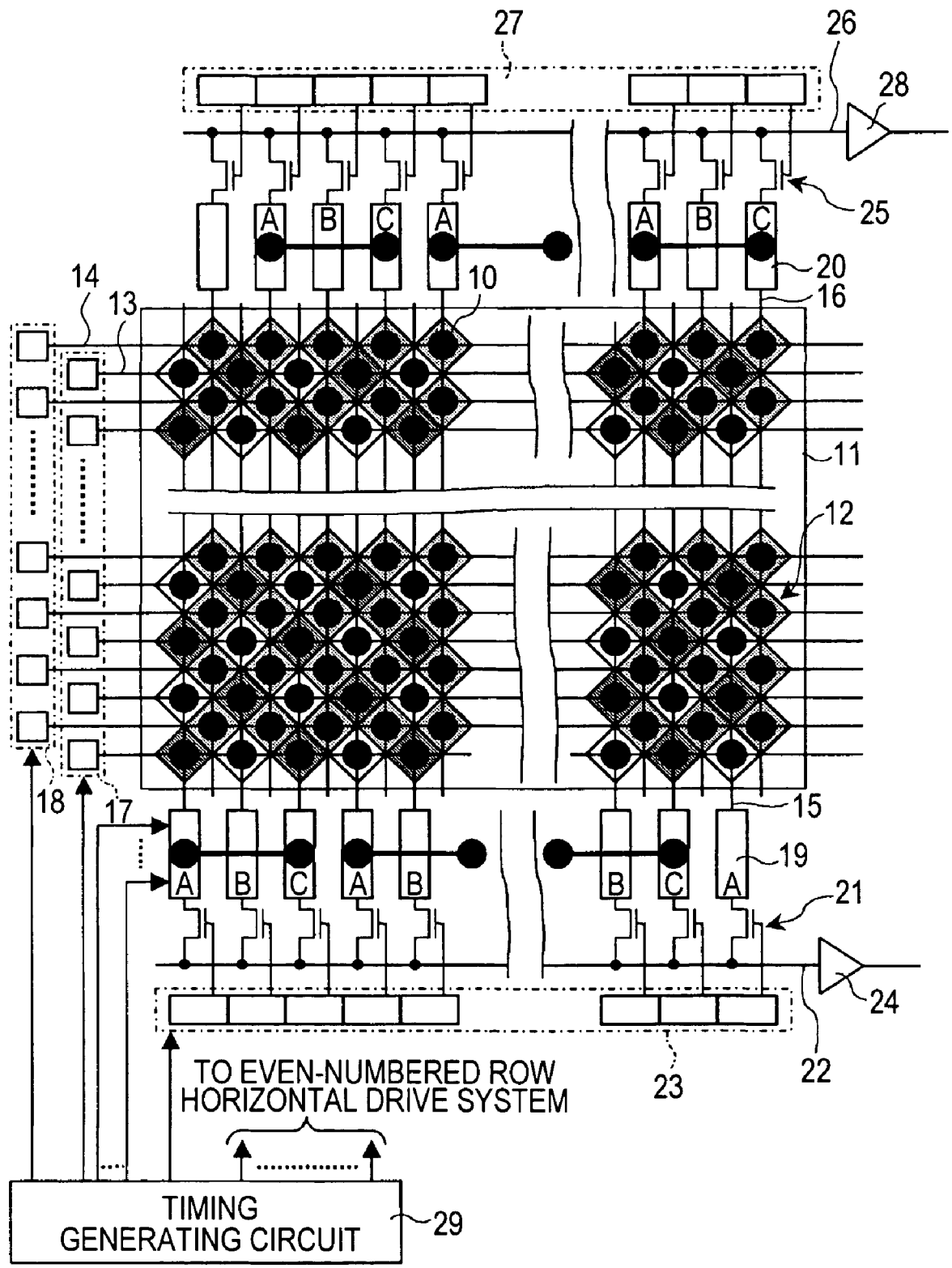
FIG. 16 is a schematic diagram illustrating the configuration of a CMOS image sensor according to an embodiment of the present invention.

FIG. 16 schematically illustrates the configuration of an X-Y address solid-state imaging device, for example, a CMOS image sensor, according to an embodiment of the present invention.

The CMOS image sensor shown in FIG. 16 includes pixels 10, a pixel array 11, a color filter 12, an odd-numbered row drive line group 13, an even-numbered row drive line group 14, an odd-numbered column signal line (vertical signal line) group 15, an even-numbered column signal line (vertical signal line) group 16, an odd-numbered row vertical selection circuit 17, an even-numbered row vertical selection circuit 18, odd-numbered row column processing circuits 19, even-numbered row column processing circuits 20, odd-numbered row horizontal switches 21, an odd-numbered row horizontal signal line 22, an odd-numbered row horizontal selection circuit 23, output amplifiers 24 and 28, even-numbered row horizontal switches 25, an even-numbered row horizontal signal line 26, an even-numbered row horizontal selection circuit 27, and a timing generating circuit 29.

In FIG. 16, the pixels 10 having photoelectric transducers disposed in a matrix form the pixel array (pixel area) 11. In the pixel array 11, the even-numbered column pixels 10 are displaced from the odd-numbered column pixels 10 in the column direction (vertical direction in FIG. 16) by about 1/2 the pixel pitch, and the even-numbered row pixels 10 are displaced from the odd-numbered row pixels 10 in the row direction (horizontal direction in FIG. 16) by about 1/2 the pixel pitch. That is, the pixel array 11 forms an oblique pixel pattern.

Figure 1:
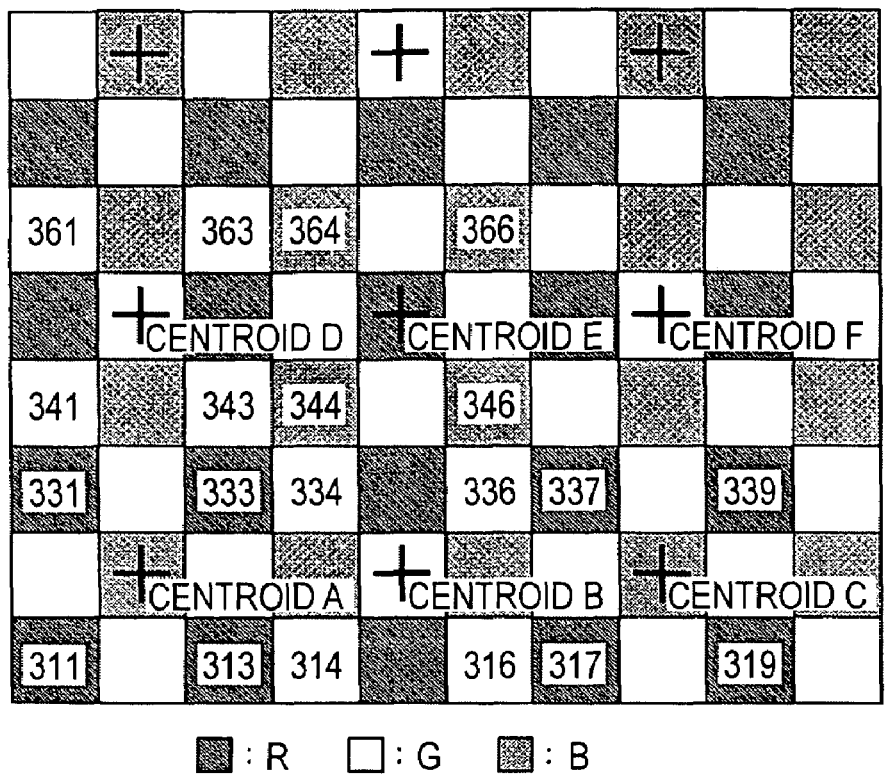
FIG. 1 illustrates color coding of a Bayer pattern.
Figure 2:
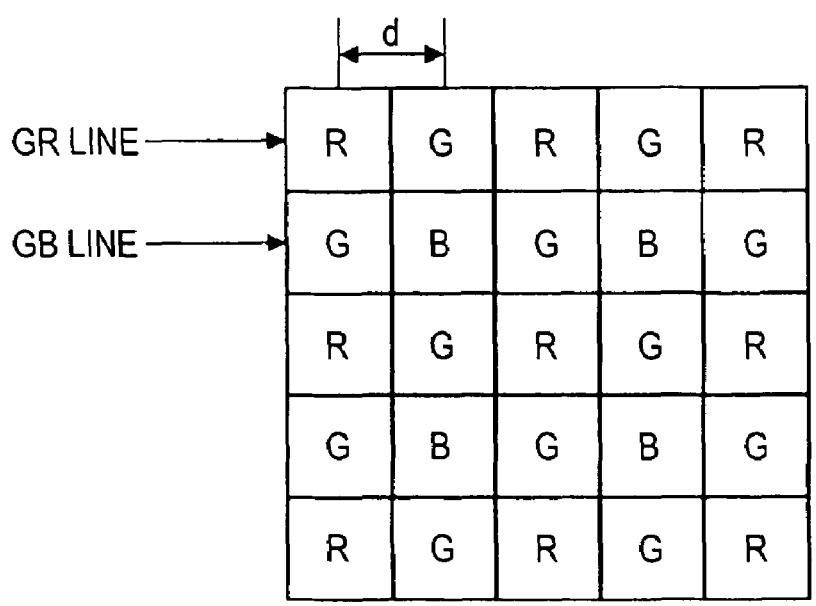
FIG. 2 illustrates color coding of the Bayer pattern shown in FIG. 1.
Figure 3A:
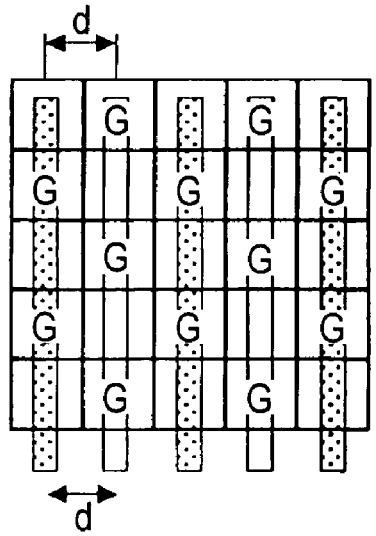
FIGS. 3A through 3D illustrate the relationship between the patterns of the individual colors in the Bayer pattern and the sampling rates.
Figure 3B:
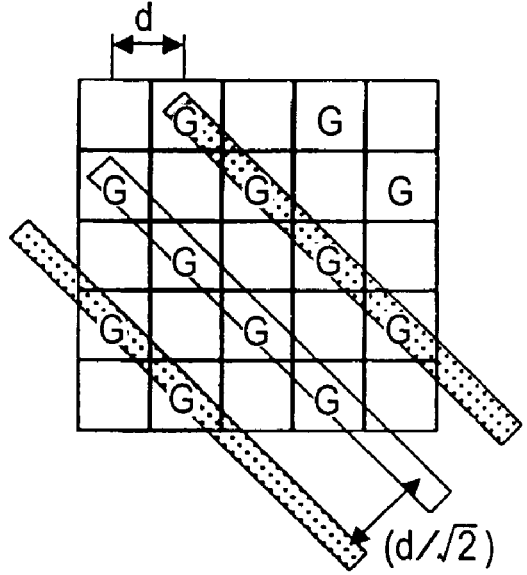
Figure 3C:
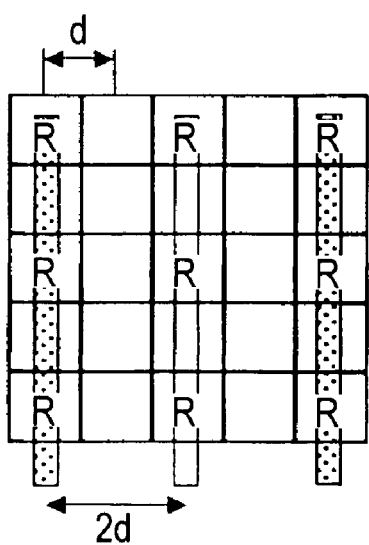
Figure 3D:
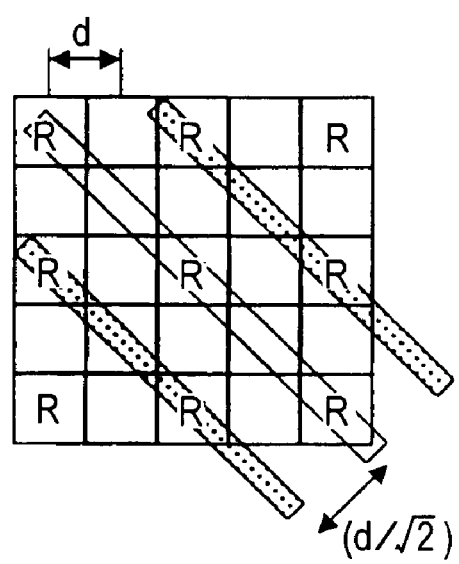
Figure 4:
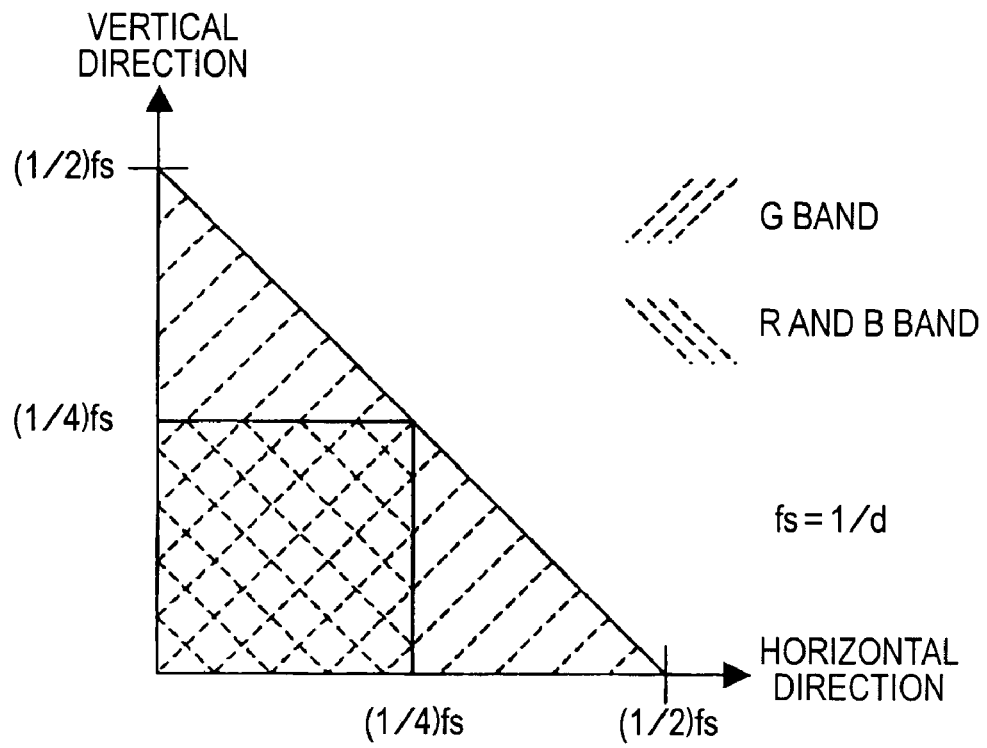
FIG. 4 illustrates the frequency characteristics of the Bayer pattern.
Figure 5:
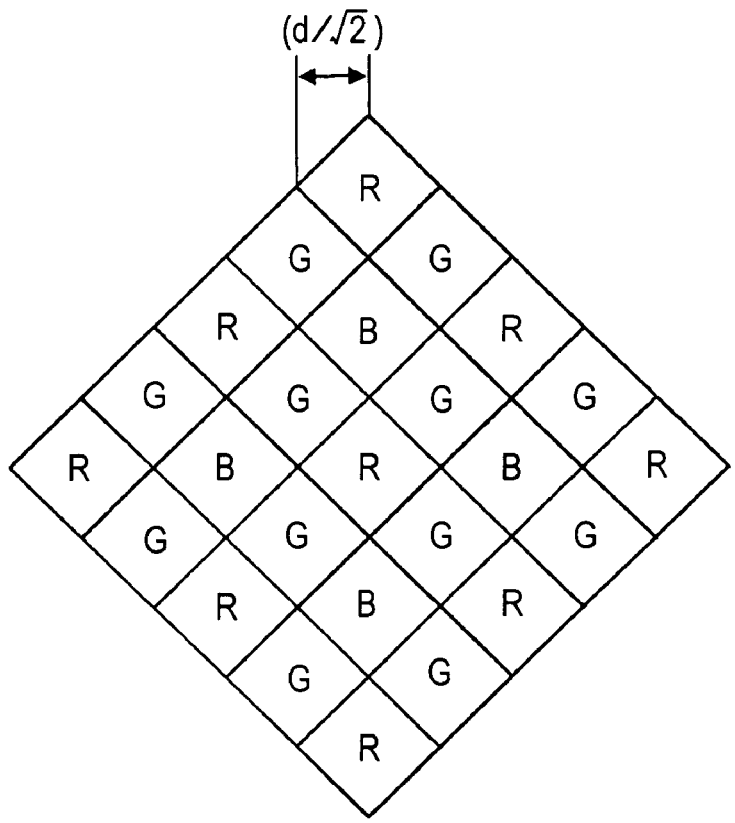
FIG. 5 illustrates color coding of a Bayer pixel shifted pattern.
Figure 6A:
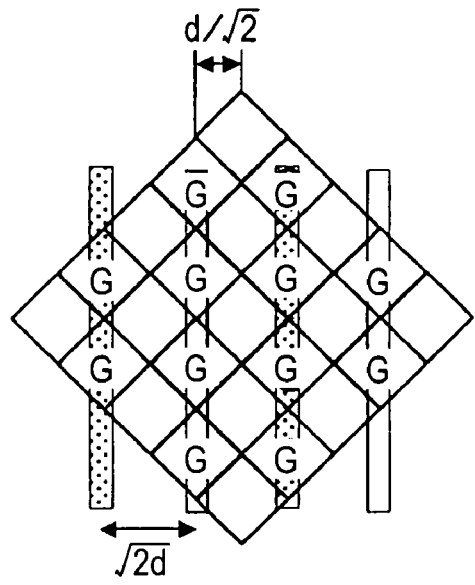
FIGS. 6A through 6D illustrate the relationship between the patterns of the individual colors in the Bayer pixel shifted pattern and the sampling rates.
Figure 6B:
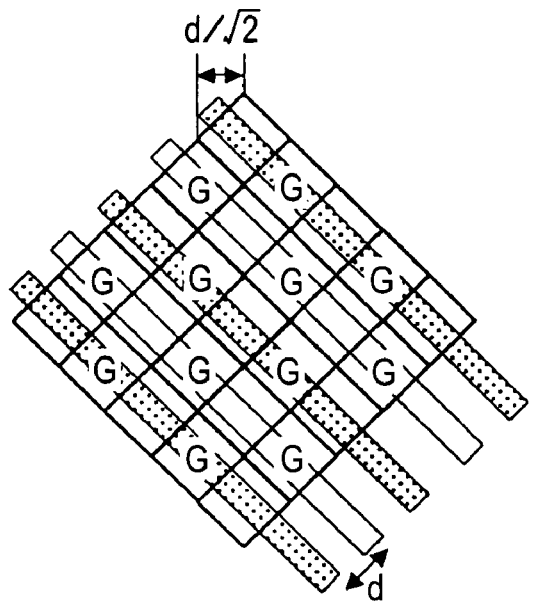
Figure 6C:
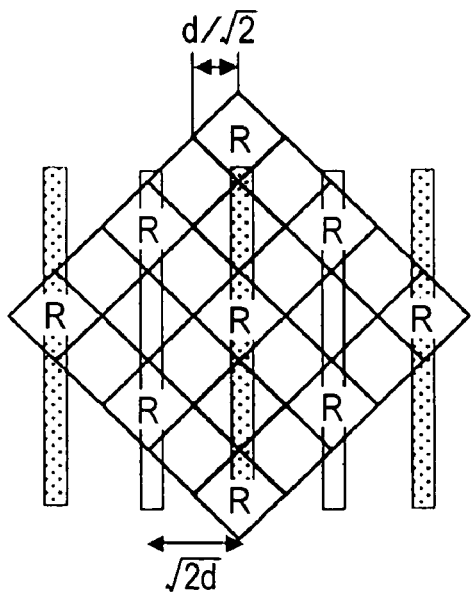
Figure 6D:
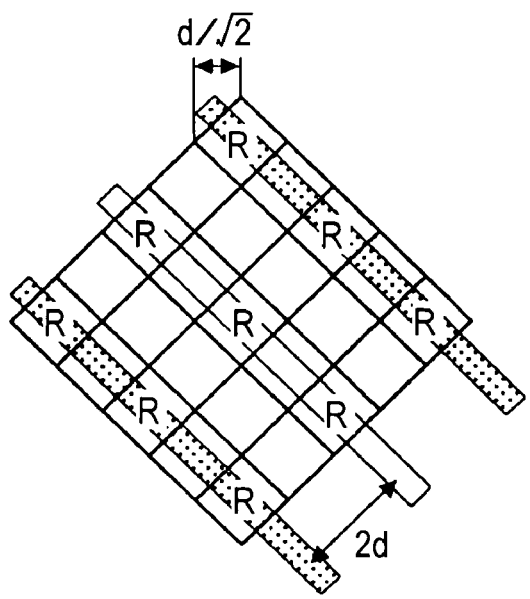
Figure 7:
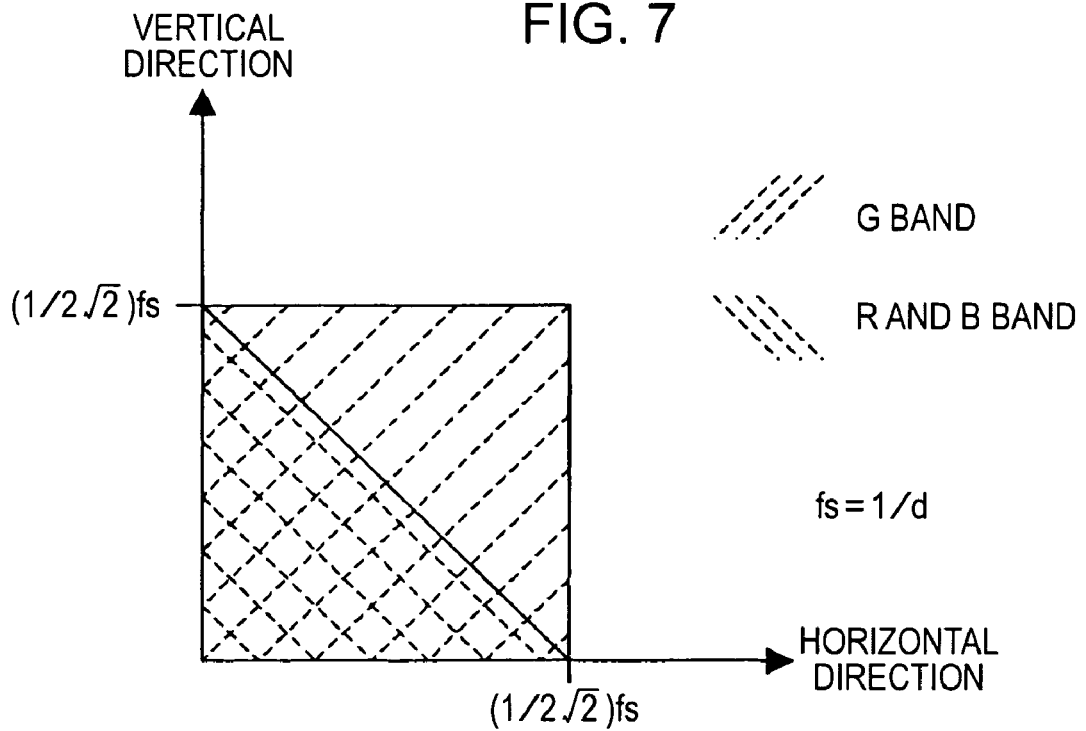
FIG. 7 illustrates the frequency characteristics of the Bayer pixel shifted pattern.
Figure 8:
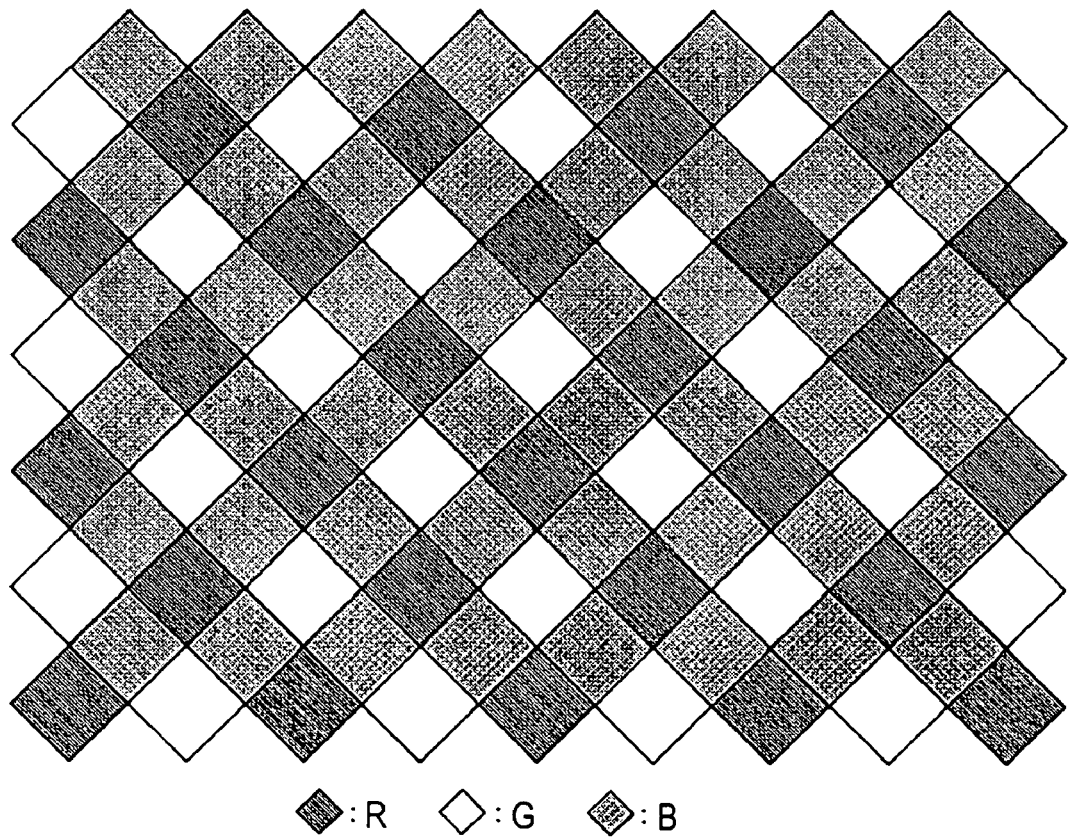
FIG. 8 illustrates color coding of a color pattern shifted from the Bayer pattern by 45°.
Figure 9:
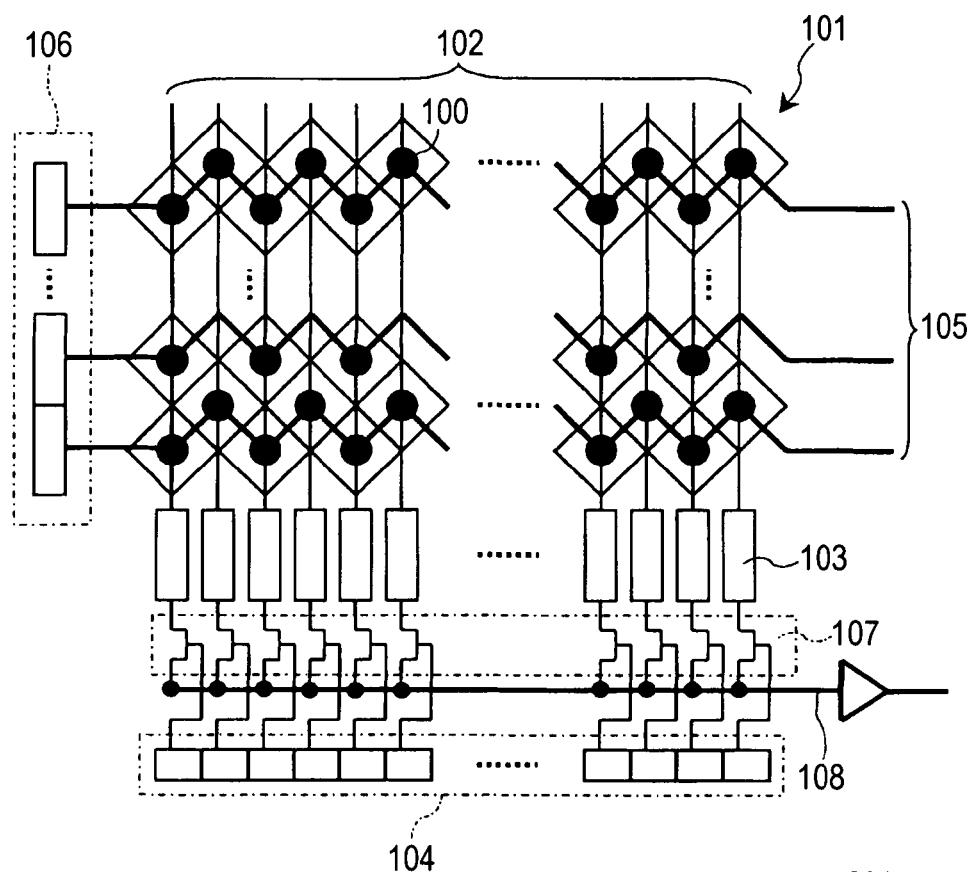
FIG. 9 is a schematic diagram illustrating an example of the configuration of a CMOS image sensor having an oblique pixel pattern.
Figure 10:
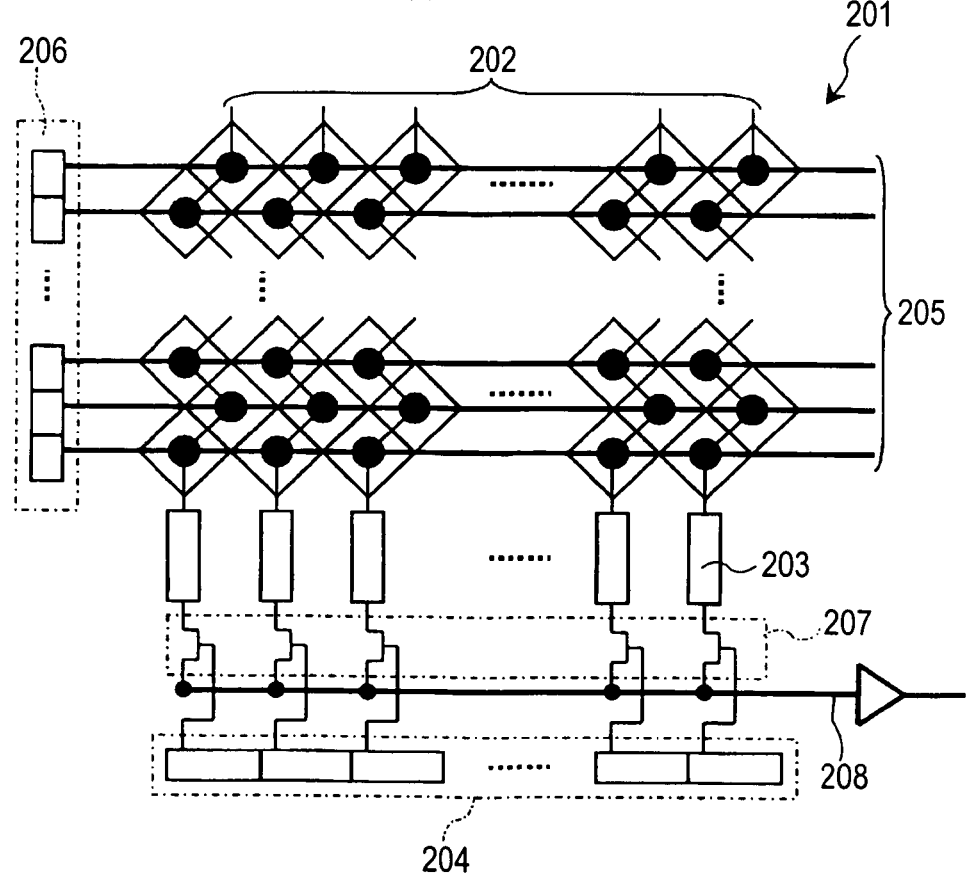
FIG. 10 is a block diagram illustrating another example of the configuration of a CMOS image sensor having an oblique pixel pattern.

In the pixel array 11 having an oblique pixel pattern, the color filter 12 having color coding (see FIG. 8) shifted from the Bayer pattern by 45° is disposed on the pixels 10. An odd-numbered row drive line of the odd-numbered row drive line group 13 is provided for each odd-numbered row of the pixels 10, and an even-numbered row drive line of the even-numbered row drive line group 14 is provided for each even-numbered row of the pixels 10. An odd-numbered column signal line of the odd-numbered column signal line group 15 is connected to each odd-numbered column of the pixels 10, and an even-numbered column signal line of the even-numbered column signal line group 16 is connected to each even-numbered column of the pixels 10.

One end of each of the odd-numbered row drive lines of the odd-numbered row drive line group 13 is connected to the corresponding output terminal of the odd-numbered row vertical selection circuit 17. One end of each of the even-numbered row drive lines of the even-numbered row drive line group 14 is connected to the output terminal of the even-numbered row vertical selection circuit 18. The odd-numbered row vertical selection circuit 17 and the even-numbered row vertical selection circuit 18 form a row selector for selecting the pixels 10 of an odd-numbered row and an even-numbered row which are not adjacent to each other in the pixel array 11 via the odd-numbered row drive line group 13 and the even-numbered row drive line group 14, respectively.

One end of each of the odd-numbered column signal lines of the odd-numbered column signal line group 15 is connected to the input terminal of the corresponding odd-numbered row column processing circuit 19 disposed at one side (in this embodiment, the lower side in FIG. 16) of the pixel array 11. The odd-numbered row column processing circuits 19 store the pixel signals in the odd-numbered rows, and add the pixel signals in every other column.

One end of each of the even-numbered column signal lines of the even-numbered column signal line group 16 is connected to the input terminal of the corresponding even-numbered row column processing circuit 20 disposed at the other side (in this embodiment, the upper side in FIG. 16) of the pixel array 11. The even-numbered row column processing circuits 20 store the pixel signals in the even-numbered rows, and add the pixel signals in every other column.

The specific circuit configurations of the odd-numbered row column processing circuits 19 and the even-numbered row column processing circuits 20 are described below. Signs A, B, and C appended to the odd-numbered row column processing circuits 19 and the even-numbered row column processing circuits 20 in FIG. 16 are for distinguishing switches shown in FIG. 17.

The output terminals of the odd-numbered row column processing circuits 19 are connected to the odd-numbered horizontal signal line 22 via the corresponding odd-numbered row horizontal switches 21. The odd-numbered row horizontal switches 21 are sequentially selected by the odd-numbered row horizontal selection circuit 23 so that the signals added in the odd-numbered row column processing circuits 19 are read out to the odd-numbered row horizontal signal line 22. The signals read out to the odd-numbered row horizontal signal line 22 are amplified in the output amplifier 24 and are then output.

The output terminals of the even-numbered row column processing circuits 20 are connected to the even-numbered row horizontal signal line 26 via the corresponding even-numbered row horizontal switches 25. The even-numbered row horizontal switches 25 are sequentially selected by the even-numbered row horizontal selection circuit 27 so that the signals added in the even-numbered row column processing circuits 20 are read out to the even-numbered row horizontal signal line 26. The signals read out to the even-numbered row horizontal signal line 26 are amplified in the output amplifier 28 and are then output.

The odd-numbered row horizontal selection circuit 23 and the even-numbered row horizontal selection circuit 27 form a column selector for selecting columns so that column numbers in the odd-numbered rows do not coincide with column numbers in the even-numbered rows. The drive control of the odd-numbered row vertical selection circuit 17, the even-numbered row vertical selection circuit 18, the odd-numbered row column processing circuits 19, the even-numbered row column processing circuits 20, the odd-numbered row horizontal selection circuit 23, and the even-numbered row horizontal selection circuit 27 is performed based on various timing signals output from the timing generating circuit 29.

Figure 17:
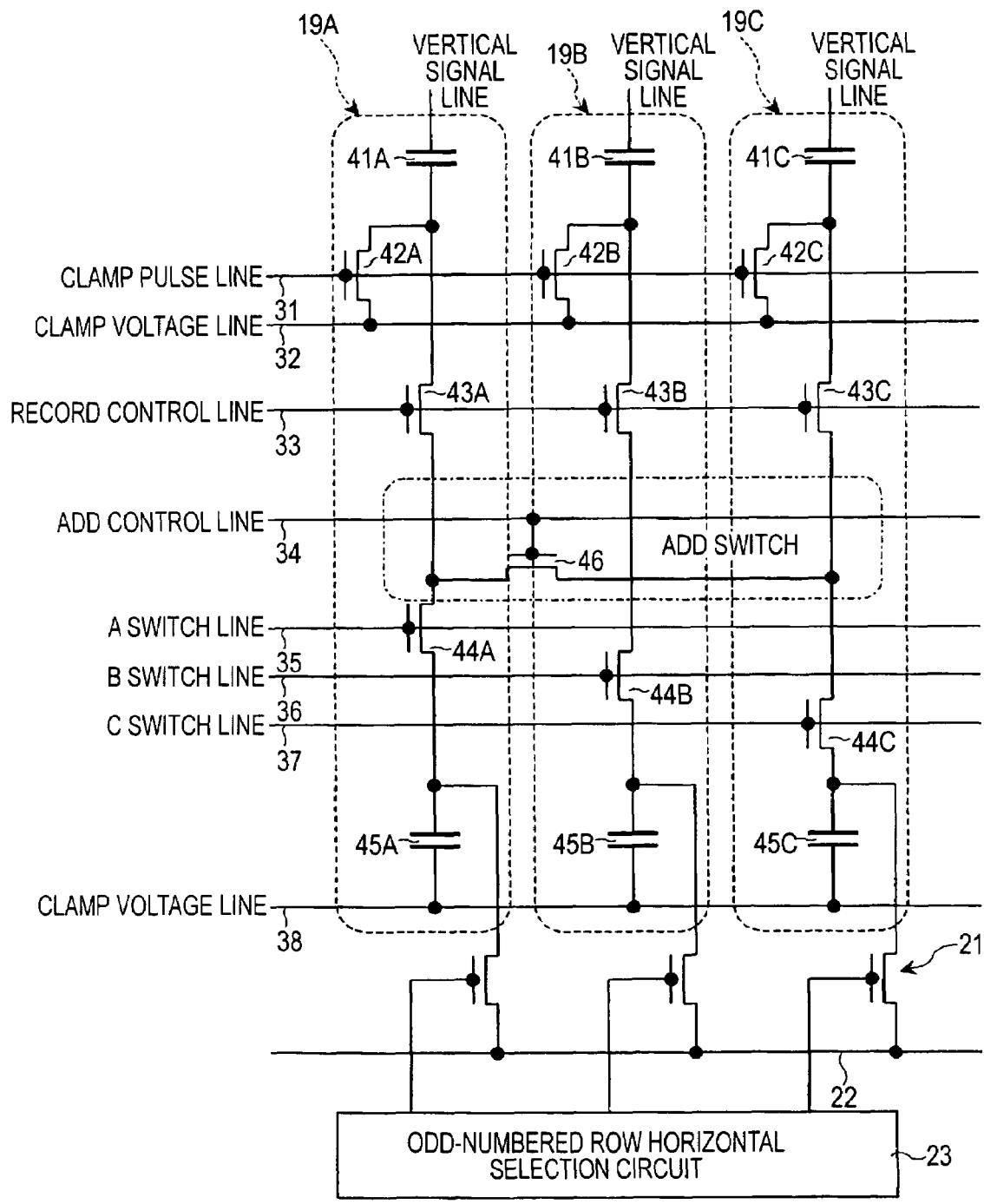
FIG. 17 is a circuit diagram illustrating an example of the configuration of odd-numbered column processing circuits.

FIG. 17 is a circuit diagram illustrating an example of the configuration of the odd-numbered row column processing circuits 19, assuming that the same colors of pixels in the two columns and the two rows are added in the color coding (see FIG. 8) shifted from the Bayer pattern by 45°. Basically, the even-numbered row column processing circuits 20 have the same configuration.

In FIG. 17, a clamp pulse line 31, a clamp voltage line 32, a record control line 33, an add control line 34, an A switch line 35, a B switch line 36, a C switch line 37, and a clamp voltage line 38 are connected to each of the odd-numbered column processing circuits 19A, 19B, and 19C (corresponding to the column processing circuits A, B, and C shown in FIG. 16), which form one unit.

Basically, the column processing circuits 19A, 19B, and 19C have the same circuit configuration. The column processing circuit 19A includes a clamp capacitor 41A, first, second, and third switches 42A, 43A, and 44A, and a sample-and-hold capacitor 45A. The column processing circuit 19B includes a clamp capacitor 41B, first, second, and third switches 42B, 43B, and 44B, and a sample-and-hold capacitor 45B. The column processing circuit 19C includes a clamp capacitor 41C, first, second, and third switches 42C, 43C, and 44C, and a sample-and-hold capacitor 45C. As the first, second, and third switches, N-channel MOS transistors may be used.

A more specific configuration of the column processing circuit 19 is discussed below by taking the column processing circuit 19A as an example. One end of the clamp capacitor 41A is connected to one end of the corresponding odd-numbered column signal line (vertical signal line) of the odd-numbered column signal line group 15. The first switch 42A is connected between the other end of the clamp capacitor 41A and the clamp voltage line 32, and the gate of the first switch 42A is connected to the clamp pulse line 31. One main electrode of the second switch 43A is connected to the other end of the clamp capacitor 41A, and the gate electrode thereof is connected to the record control line 33.

One main electrode of the third switch 44A is connected to the other main electrode of the second switch 43A, and the gate electrode thereof is connected to the A switch line 35. In the column processing circuit 19B, the gate electrode of the third switch 44B is connected to the B switch line 36. In the column processing circuit 19C, the gate electrode of the third switch 44C is connected to the C switch line 37. One end of the sample-and-hold capacitor 45A is connected to the other main electrode of the third switch 44A, and the other end thereof is connected to the clamp voltage line 38.

In the above-configured column processing circuits 19A, 19B, and 19C, in this embodiment, pixel signals in the column processing circuits 19A and 19C are added. Accordingly, an add switch 46 is connected between the column processing circuits 19A and 19C, and more specifically, between the main electrodes of the third switches 44A and 44C in the column processing circuits 19A and 19C. As the add switch 46, an N-channel MOS transistor may be is used. The gate of the add switch 46 is connected to the add control line 34.

The operation of the CMOS image sensor having the oblique pixel pattern including the above-configured column processing circuits 19A, 19B, and 19C according to this embodiment is described below with reference to the timing chart in FIG. 18.

Figure 18:
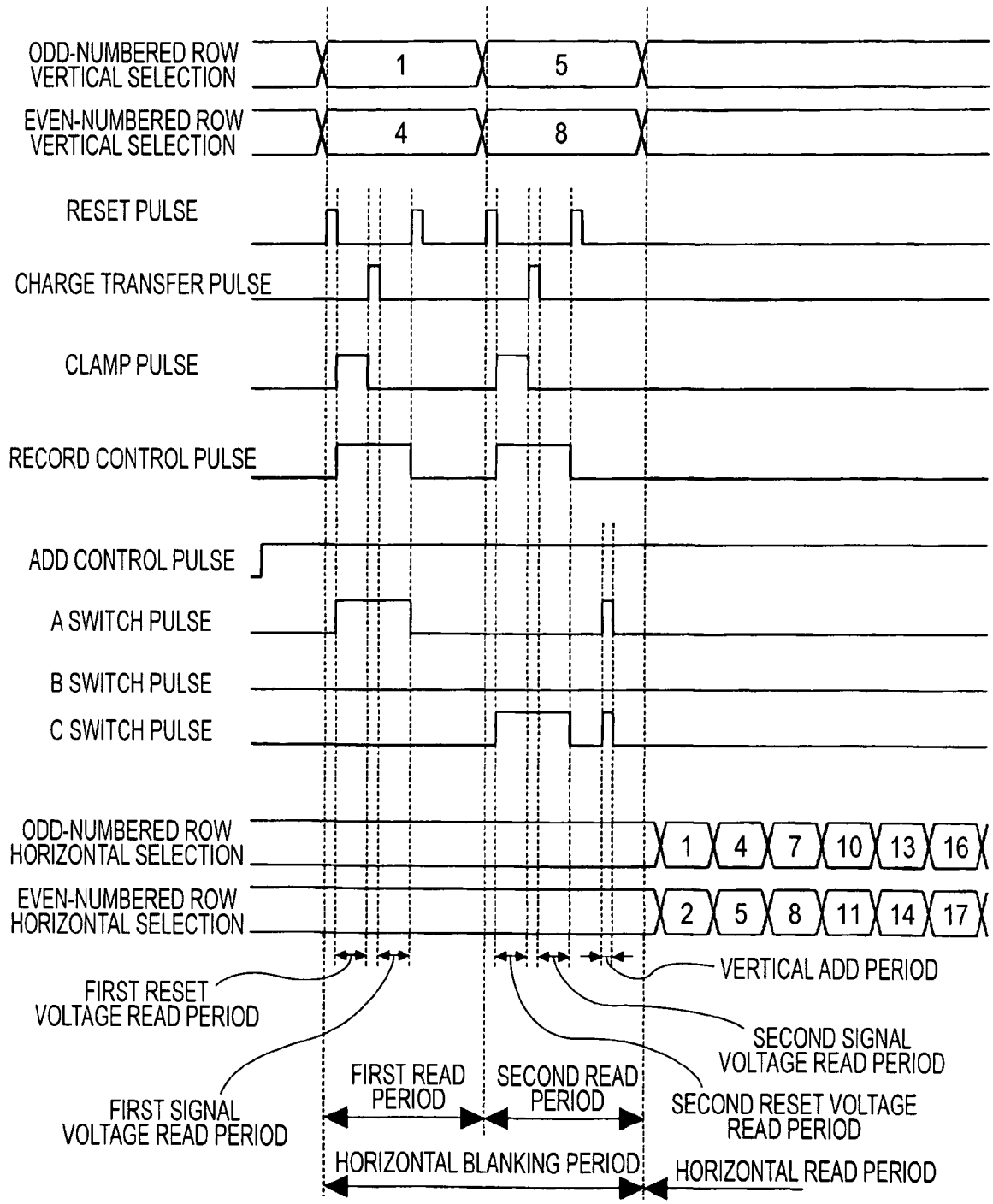
FIG. 18 is a timing chart illustrating the operation of a CMOS image sensor shown in FIG. 16.

FIG. 18 shows the timing relationships among a reset pulse for resetting the potential in a floating diffusion region in the pixel 10, a charge transfer pulse for transferring signal charge photoelectrically converted in a photoelectric transducer to the floating diffusion region, a clamp pulse supplied to the clamp pulse line 31, a record control pulse supplied to the record control line 33, an add control pulse supplied to the add control line 34, an A switch pulse supplied to the A switch line 35, a B switch pulse supplied to the B switch line 36, and a C switch pulse supplied to the C switch line 37.

When operating, in the addition read mode, the CMOS image sensor having the oblique pixel pattern of this embodiment, the add control pulse is changed to the H level to cause the add switch 46 to be in the ON state. If the addition operation is not performed, the add control pulse is changed to the L level to cause the add switch 46 to be in the OFF state. In this case, dummy switches are preferably disposed in the column processing circuits 19 and 20 so that variations of the load capacitance of the add switch 46 connected to the vertical signal line in the odd-numbered row signal line group 15 and the vertical signal line in the even-numbered row signal line group 16 become unnoticeable.

In FIG. 16, the first row is selected by vertical scanning by the odd-numbered row vertical selection circuit 17, and the fourth row is selected by vertical scanning by the even-numbered row vertical selection circuit 18. By selecting the rows in this manner, an odd-numbered row and an even-numbered row which are not adjacent to each other are read at the same time, which is a feature of the embodiment of the present invention. This is described below, together with the first embodiment (FIG. 11), for easy understanding.

The reset pulse is first supplied to the pixels in the selected two rows (first and fourth rows), and then, reset voltages reflecting the reset levels of the pixels appear in the corresponding signal lines in the vertical signal line groups 15 and 16. In this case, the clamp pulse is changed to the H level so that the first switches 42A, 42B, and 42C are turned ON in FIG. 17, and then, the reset voltages of the signal lines in the vertical signal line groups 15 and 16 are stored in the clamp capacitors 41A, 41B, and 41C (first reset voltage read period). Then, the clamp pulse is changed to the L level to turn OFF the first switches 42A, 42B, and 42C.

Subsequently, the charge transfer pulse is supplied to the selected two rows (first and fourth rows), and then, signal voltages reflecting the optical signal levels of the pixels 10 appear in the corresponding signal lines of the vertical signal line groups 15 and 16. In this case, since the difference between the signal voltages and the reset voltages stored in the clamp capacitors 41A, 41B, and 41C is generated, fixed pattern noise is removed from the pixels 10 (first signal voltage read period).

Then, the record control pulse is changed to the H level, and also, the A switch pulse is changed to the H level so that the signal in the column in which the third switch 44A (hereinafter simply referred to as the "A switch 44A") is connected to the A switch line 35 is added to the signal in the column in which the third switch 44C (hereinafter simply referred to as the "C switch 44C") is connected to the C switch line 37.

As a result, the signal in the column connected to the A switch 44A is added to the signal in the column connected to the C switch 44C via the add switch 46, and the added signal is stored in the sample-and-hold capacitor 45A of the column processing circuit 19A. More specifically, in FIG. 11, in the odd-numbered row, the signal of the R pixel 111 and the signal of the R pixel 113 are added, the signal of the G pixel 114 and the signal of the G pixel 116 are added, and so on. In the even-numbered row, the signal of the G pixel 142 and the signal of the G signal 144 are added, the signal of the B signal 145 and the signal of the B signal 147 are added, and so on.

Then, both the record control pulse and the A switch pulse are changed to the L level. Thereafter, the floating diffusions (FDs) of the selected two rows are reset. The period up to the operation so far is the first read period including the first reset voltage read period and the first signal voltage read period.

Subsequently, in FIG. 16, the fifth row is selected by vertical scanning by the odd-numbered row vertical selection circuit 17, and the eighth row is selected by vertical scanning by the even-numbered row vertical selection circuit 18. The odd-numbered row and the even-numbered row which are not adjacent to each other are read out at the same time.

The reset pulse is first supplied to the pixels in the selected two rows (fifth row and eighth row), and then, reset voltages reflecting the reset levels of the pixels appear in the corresponding signal lines of the vertical signal line groups 15 and 16. Then, the clamp pulse is changed to the H level to turn ON the first switches 42A, 42B, and 42C, and the reset voltages of the signal lines in the vertical signal line groups 15 and 16 are stored in the clamp capacitors 41A, 41B, and 41C (second reset voltage read period). Then, the clamp pulse is changed to the L level to turn OFF the first switches 42A, 42B, and 42C.

Subsequently, the charge transfer pulse is supplied to the selected two rows (fifth row and eighth row), and signal voltages reflecting the optical signal levels of the pixels appear in the corresponding signal lines of the vertical signal line groups 15 and 16. Since the difference between the signal voltages and the reset voltages stored in the clamp capacitors 41A, 41B, and 41C is generated, fixed pattern noise can be removed from the pixels 10 (second signal voltage read period).

Then, the record control pulse is changed to the H level, and the C switch pulse is changed to the H level so that the signal in the column connected to the A switch 44A is added to the signal in the column connected to the C switch 44C and the added signal is stored in the sample-and-hold capacitor 45C of the column processing circuit 19C.

As a result, the signal in the column connected to the A switch 44A is added to the signal in the column connected to the C switch 44C via the add switch 46, and the added signal is stored in the sample-and-hold circuit 45C of the column processing circuit 19C. More specifically, in FIG. 11, in the odd-numbered rows, the signal of the R pixel 151 and the signal of the R pixel 153 are added, the signal of the B pixel 154 and the signal of the B pixel 156 are added, and so on. In the even-numbered rows, the signal of the G pixel 182 and the signal of the G pixel 184 are added, the signal of the G pixel 185 and the signal of the G pixel 187 are added, and so on.

Subsequently, the record control pulse and the C switch pulse are changed to the L level, and the floating diffusion regions of the pixels of the selected two rows are reset. Then, the A switch pulse and the C switch pulse are changed to the H level to turn on the A switch 44A and the C switch 44C. As a result, the horizontal added signals stored in the sample-and-hold capacitors 45A and 45C of the column processing circuits 19A and 19C are vertically added (vertical add period).

More specifically, in the odd-numbered rows, the horizontal added signal (the signal of the R pixel 111 and the R pixel 113, the signal of the B pixel 114 and the B pixel 116, and so on) stored in the sample-and-hold capacitor 45A and the horizontal added signal (the signal of the R pixel 151 and the R pixel 153, the signal of the B pixel 154 and the B pixel 156, and so on) are vertically added.

In the even-numbered rows, the horizontal added signal (the signal of the G pixel 142 and the G pixel 144, the signal of the G pixel 145 and the G pixel 147, and so on) stored in the sample-and-hold capacitor 45A and the horizontal added signal (the signal of the G pixel 182 and the G pixel 183, the signal of the G pixel 185 and the G pixel 187, and so on) are vertically added.

According to the above-described addition operation, in the color coding of the first embodiment shifted from the Bayer pattern by 45°, from a 3×3 pixel area, the same color of pixels in the two columns and the two rows are extracted and added. The signal obtained by adding the pixels can be read out either from the sample-and-hold capacitor 45A or 45C. The period up to the operation so far is the second read period including the second reset voltage read period, the second signal voltage read period, and the vertical add period.

In the aforementioned reading method, the added signal of horizontal x pixels (in this embodiment, x=2) is stored in a single sample-and-hold capacitor 45 (45A, 45B, or 45C), and this operation is repeated for the same number of vertical y columns (in this embodiment, y=2). In this case, if x≧y, the sample-and-hold capacitors 45 provided for the same number of columns of the original pixel pattern are sufficient. Thus, extra sample-and-hold capacitors are not necessary for the addition operation.

The first read period and the second read period form a horizontal blanking period. In one horizontal blanking period, an odd-numbered row and an even-numbered row which are not adjacent to each other are read out a plurality of times (in this embodiment, twice since vertical two pixels (two rows) are added), which is a feature of this embodiment of the invention. After the horizontal blanking period, the horizontal read period starts.

If the added signal is read out from the sample-and-hold capacitor 45A of the column processing circuit 19A in the vertical add period, the first column, the fourth column, the seventh column, and so on, can be selected in the odd-numbered row horizontal selection circuit 23 according to the configuration shown in FIG. 16. Then, the added signal in the odd-numbered rows can be extracted. Similarly, the second column, the fifth column, the eighth column, and so on can be selected by the even-numbered row horizontal selection circuit 27, and then, the added signal in the even-numbered rows can be extracted.

In this case, the columns corresponding to an odd-numbered row and the columns corresponding to an even-numbered row are selected such that they are displaced from each other. That is, the column numbers corresponding to an odd-numbered row selected by the odd-numbered row horizontal selection circuit 23 do not coincide with the column numbers corresponding to an even-numbered row selected by the even-numbered row horizontal selection circuit 27. This is necessary for the pattern of the added signals to match the original pattern of the pixel signals.

As discussed above, the solid-state imaging device having the oblique pixel pattern includes the vertical selection circuits 17 and 18 for simultaneously selecting an odd-numbered row and an even-numbered row, respectively, which are not adjacent to each other, for a plurality of times during one horizontal blanking period, the column processing circuits 19 (19A, 19B, and 19C) and 20 (20A, 20B, and 20C) having the odd-numbered row horizontal switches 21 and the even-numbered row horizontal switches 25, respectively, and the horizontal selection circuits 23 and 27 for selecting the switches 21 and 25, respectively. With this configuration, the columns corresponding to a selected odd-numbered row and the columns corresponding to a selected even-numbered row are displaced from each other. Accordingly, after adding pixels, the original color coding can be maintained without changing the color spatial repeat pattern or the pixel pitch ratio in the vertical, horizontal, and oblique directions. As a result, by spatially equal sampling, high-quality added signals can be obtained. At the same time, the added signals can be output in the same color pattern as that obtained by a progressive reading method for independently reading pixel signals, thereby facilitating the signal processing in the subsequent stage.

APPLICATION EXAMPLES

The above-described X-Y address solid-state imaging device having an oblique pixel pattern, a typical example of which is a CMOS image sensor, is suitably used as the imaging device for an imaging apparatus (camera module), such as a digital still camera or a video camera.

Figure 19:
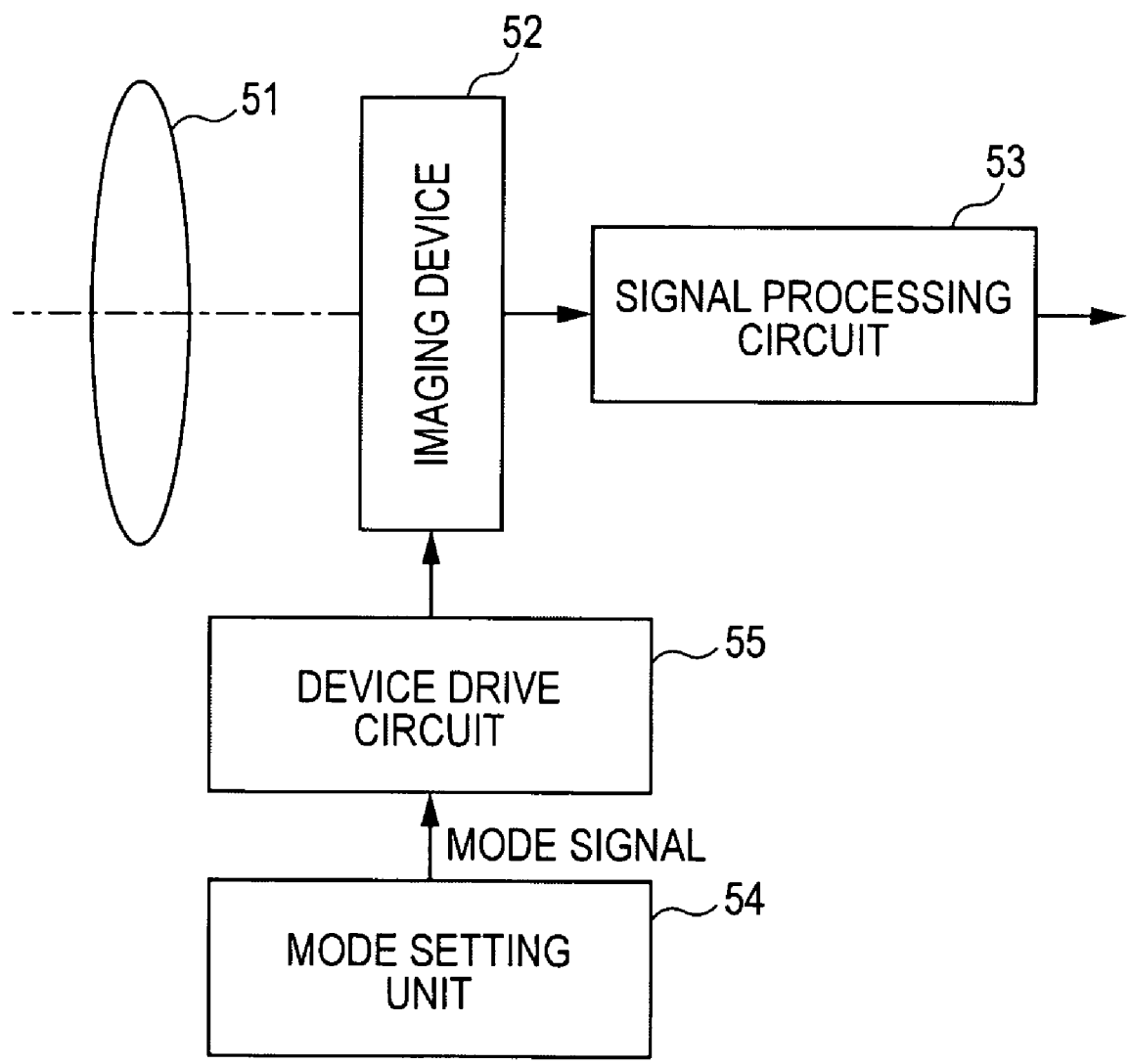
FIG. 19 is a block diagram illustrating an example of the configuration of an imaging apparatus according to an embodiment of the present invention.

FIG. 19 is a block diagram illustrating an example of the configuration of an imaging apparatus according to an embodiment of the present invention. The imaging apparatus shown in FIG. 19 includes a lens 51, an imaging device 52, a signal processing circuit 53, a mode setting unit 54, and a device drive circuit 55.

The lens 51 forms an image corresponding to light reflected by a subject on the imaging plane of the imaging device 52. Under the control of the device drive circuit 55, the imaging device 52 converts the optical image formed on the imaging plane by the lens 51 into an electric signal in units of pixels and outputs the resulting image signal. As the imaging device 52, the X-Y address solid-state imaging device including an oblique pixel pattern, a typical example of which is a CMOS image sensor, according to the above-described embodiment is used. The device drive circuit 55 may be mounted on the imaging device 52 by the on-chip technique.

The signal processing circuit 53 performs various signal processing operations on the image signal output from the imaging device 52. In response to a user's instruction, as the operation mode of the imaging device 52, the mode setting unit 54 selectively sets the progressive read mode for reading all pixel signals or the addition read mode for performing pixel addition.

The device drive circuit 55 is formed of, for example, the timing generating circuit 29 shown in FIG. 16, and controls the driving of the imaging device 52 in response to a mode signal supplied from the mode setting unit 54.

More specifically, when the progressive read mode is specified in the imaging apparatus (CMOS image sensor) shown in FIG. 16, the device drive circuit 55 performs control so that an odd-numbered row and an even-numbered row are selected by the horizontal selection circuits 17 and 18, respectively, and the signals read from the pixels of the selected rows are sequentially selected by the horizontal selection circuits 23 and 27, respectively.

When the addition read mode is specified, the device drive circuit 55 performs control so that an odd-numbered row and an even-numbered row which are not adjacent to each other are simultaneously selected by the vertical selection circuits 17 and 18, respectively, during one horizontal blanking period, for a plurality of times, and the signals of the pixels of the selected rows are horizontally added by the column processing circuits 19 (19A, 19B, and 19C) and 20 (20A, 20B, and 20C) provided with the horizontal switches 21 and 25, respectively, and the added signals are sequentially read out by the horizontal selection circuits 23 and 27.

As discussed above, the X-Y address solid-state imaging device having an oblique pixel pattern, a typical example of which is a CMOS image senor, according to one of the above-described embodiments is loaded in an imaging apparatus, such as a digital still camera or a video camera. Accordingly, the imaging apparatus can cope with both the progressive read mode and the addition read mode. Additionally, the imaging apparatus can output added signals having the same color pattern as that obtained by the progressive reading method. As a result, by spatially equal sampling, high-quality added signals can be obtained, and signal processing in the signal processing circuit 53 can be facilitated.

Sixth Embodiment

Figure 21:
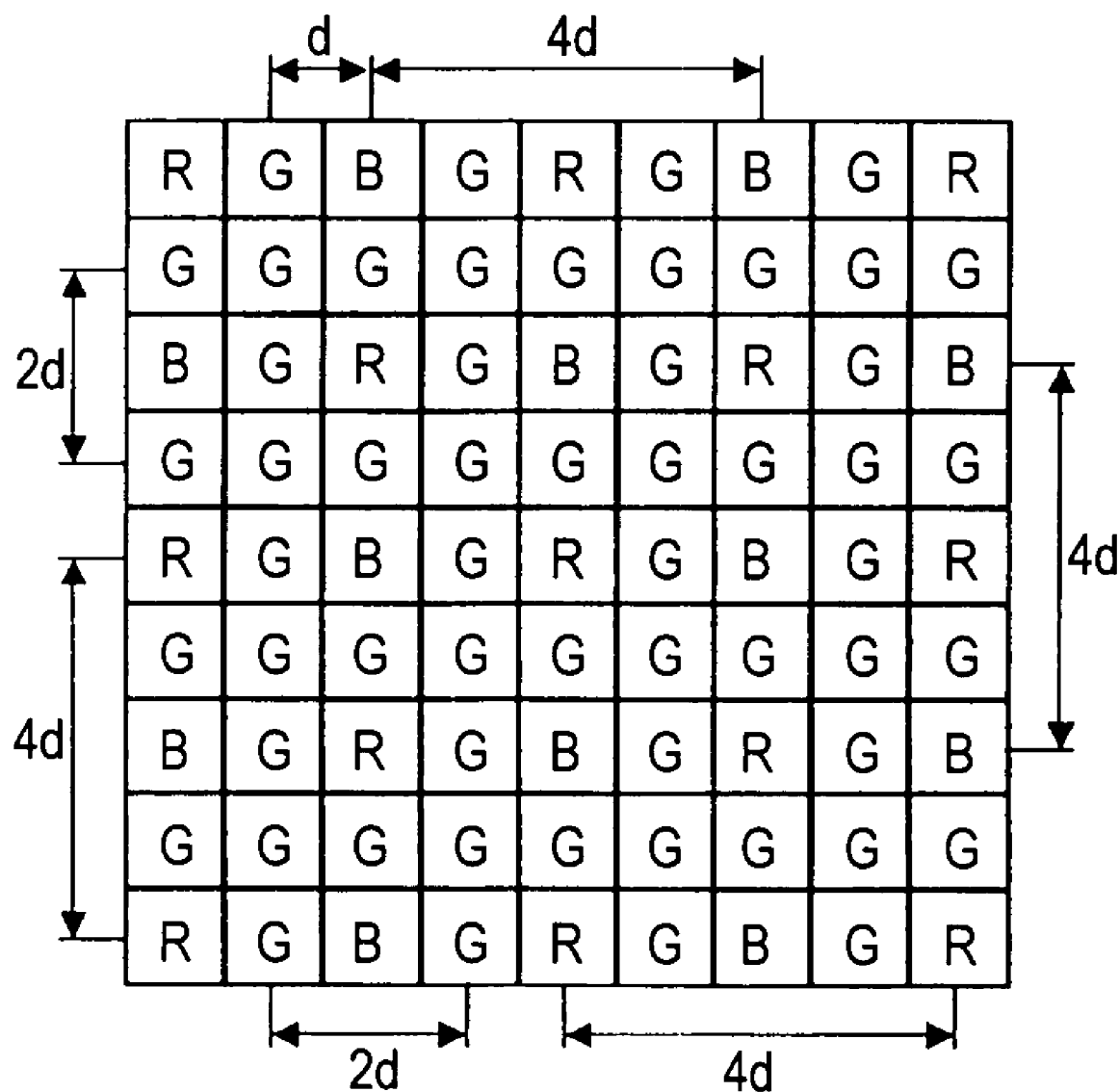
FIG. 21 illustrates the color pattern of a color filter according to a sixth embodiment of the present invention.

FIG. 21 illustrates the color pattern of a color filter according to a sixth embodiment of the present invention. In a solid-state imaging apparatus including a color pattern according to the sixth embodiment, as shown in FIG. 21, pixels (not shown) having photoelectric transducers are disposed in a square lattice at equal intervals (pixel pitches) d in the vertical direction (column direction) and the horizontal direction (row direction).

In this square-lattice pixel pattern, in the first row, RGBG, in units of four pixels, are repeatedly disposed in the horizontal direction, in the second row, only G pixels are disposed, in the third row, BGRG, in units of four pixels, are repeatedly disposed in the horizontal direction, and in the fourth row, only G pixels are disposed. Thereafter, those four rows are repeatedly disposed.

In the color pattern in this embodiment, as is seen from FIG. 21, the color components (G components in this embodiment), which are primary color components for generating luminance (Y) components, and other components (R and B components in this example) are disposed such that G components surround the R and B components. Also, in this color pattern, R and B pixels are disposed at regular intervals 4d in the vertical and horizontal directions.

In the above-configured color pattern, if the pixel sampling rate in the vertical and horizontal directions is set to be the pixel pitch d, the sampling rate for the G pixels is d, and the sampling rate for the R or B pixels is 2d. That is, the R pixel or the B pixel is disposed in every other column (in this embodiment, odd-numbered rows) and every other row (in this embodiment, odd-numbered columns) so that the sampling rate for the R and B pixels in the vertical and horizontal directions becomes 1/2 the sampling rate for the G pixels. Accordingly, the resolution of the R and B pixels is 1/2 the resolution of the G pixels. In the 45° oblique direction, the sampling rate for the G pixels is $d/2\sqrt{2}$, and the sampling rate for the R and B pixels is $2d\sqrt{2}$.

Figure 22A:
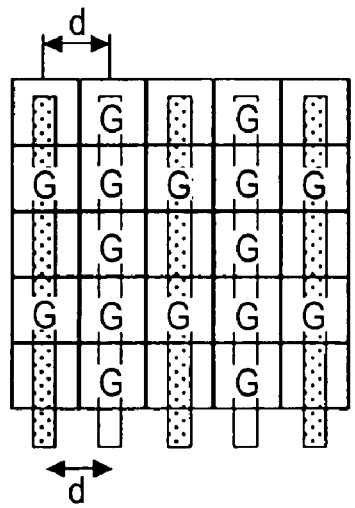
FIGS. 22A and 22B illustrate the G pattern from which only G pixels are extracted from the color pattern of the sixth embodiment.
Figure 22B:
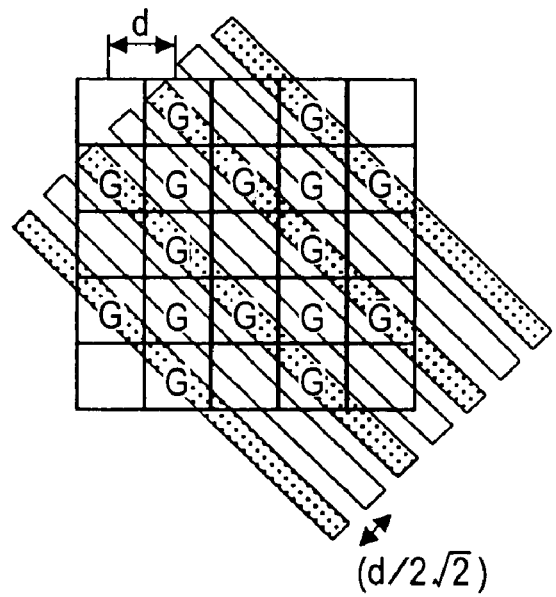

The G pattern from which only the G pixels are extracted from the color pattern shown in FIG. 21 is shown in FIGS. 22A and 22B. The spatial frequency characteristics of the G pixels are considered with reference to FIG. 22A and 22B. In the vertical and horizontal directions, since the sampling rate for the G pixels is d, as shown in FIG. 22A, signal components having frequencies up to (1/2)fs (fs: sampling frequency) can be collected according to the sampling theorem. In the 45° oblique direction, since the sampling rate for the G pixels is $d/2\sqrt{2}$, as shown in FIG. 22B, signal components having frequencies up to $(1/\sqrt{2})fs$ can be collected according to the sampling theorem.

Similarly, the spatial frequency characteristics of the R and B pixels are considered below. In this case, since the pixel pitches for the R and B pixels are the same, only the spatial frequency characteristics of the R pixels are described below.

Figure 22C:
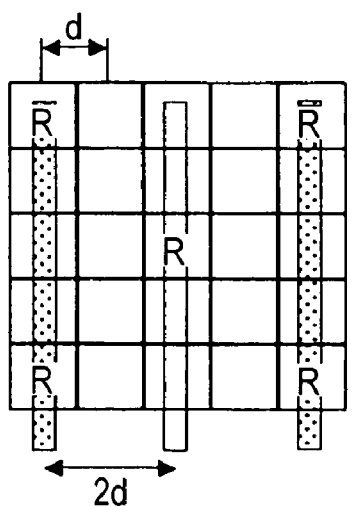
FIGS. 22C and 22D illustrate the R pattern from which only R pixels are extracted from the color pattern of the sixth embodiment.
Figure 22D:
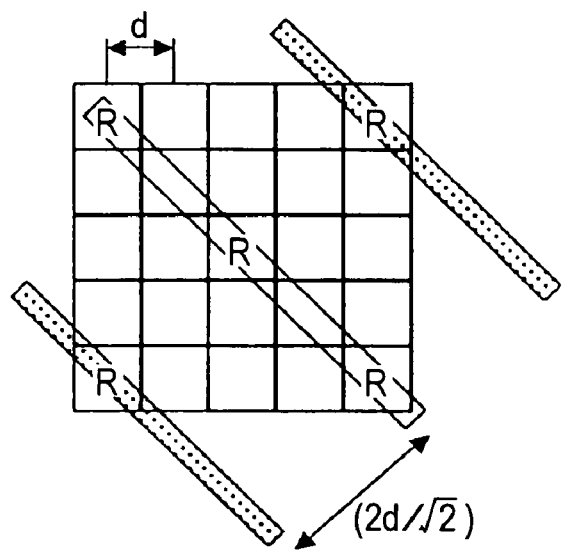

The R pattern from which only the R pixels are extracted from the color pattern shown in FIG. 21 is shown in FIGS. 22C and 22D. In FIGS. 22A through 22D, threshold frequency components that can be collected in the vertical, horizontal, and oblique directions are indicated by the voided columns and half-tone columns.

In the vertical and horizontal directions, since the sampling rate for the R pixels is 2d, as shown in FIG. 22C, signal components having frequencies up to 1/4fs can be collected according to the sampling theorem. In the 45°oblique direction, since the sampling rate for the R pixels is $2d/\sqrt{2}$, as shown in FIG. 22D, signal components having frequencies up to $(1/4\sqrt{2})fs$ can be collected according to the sampling theorem.

Figures 23, 24:
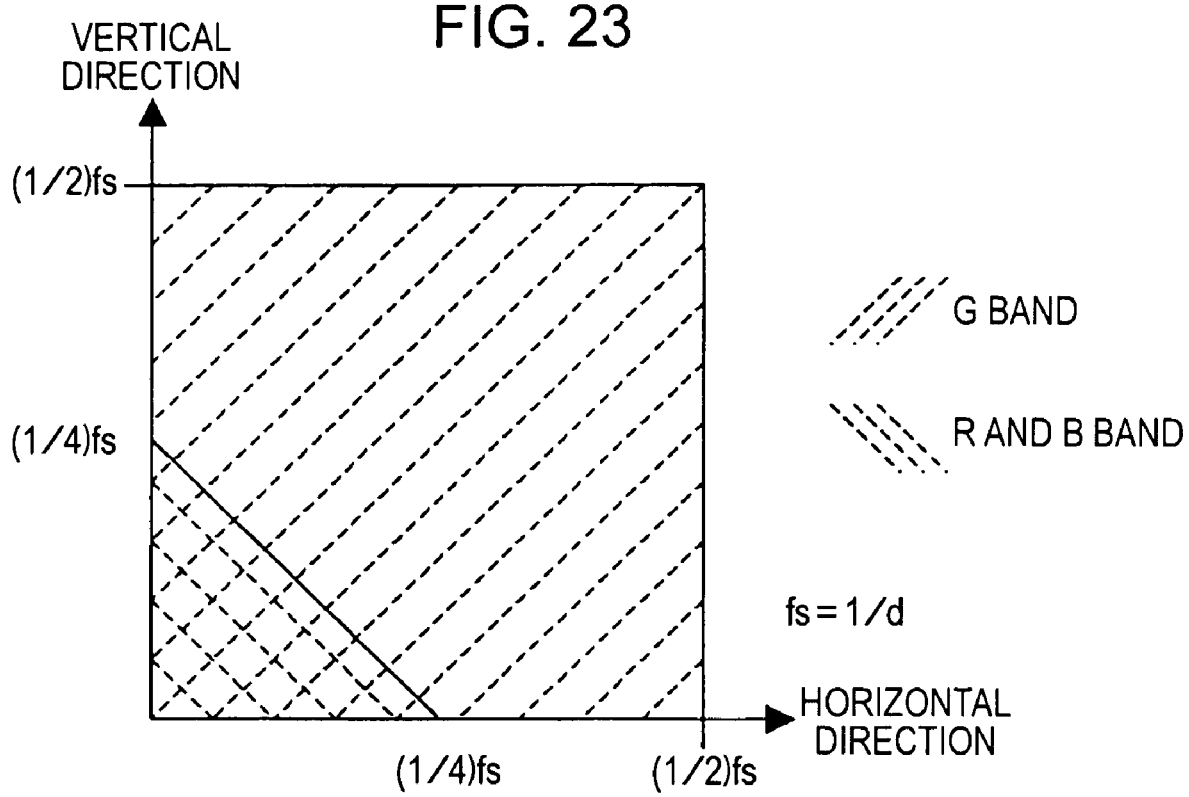
FIG. 23 illustrates the spatial frequency characteristics of the color pattern according to the sixth embodiment.
FIG. 24 illustrates the color pattern of a color filter according to a seventh embodiment of the present invention.

In accordance with the above-described points, the spatial frequency characteristics of the color pattern of the sixth embodiment are indicated in FIG. 23. Concerning the spatial frequency characteristics of the G pixels, in the vertical and horizontal directions, signal components having frequencies up to (1/2)fs can be collected, and in the oblique direction, signal components having frequencies up to $(1/\sqrt{2})fs$ can be collected. Concerning the spatial frequency characteristics of the R and B pixels, in the vertical and horizontal directions, signal components having frequencies up to (1/4)fs can be collected, and in the oblique direction, signal components having frequencies up to $(1/4\sqrt{2})fs$ can be collected.

Seventh Embodiment

FIG. 24 illustrates the color pattern of a color filter according to a seventh embodiment of the present invention. A solid-state imaging apparatus using the color filter of this embodiment has a square lattice pixel pattern, as in the solid-state imaging apparatus using the color pattern of the sixth embodiment shown in FIG. 21.

In the color pattern in this embodiment, in the first row, RGGG, in units of four pixels, are repeatedly disposed in the horizontal direction, in the second row, only G pixels are disposed, in the third row, GGBG, in units of four pixels, are repeatedly disposed in the horizontal direction, and in the fourth row, only G pixels are disposed. Thereafter, those four rows are repeatedly disposed.

In the color pattern in this embodiment, as is seen from FIG. 24, the color components (G components in this embodiment), which are primary color components for generating luminance (Y) components, and other components (R and B components in this example) are disposed such that G components surround the R and B components. Also, in this color pattern, R and B pixels are disposed at regular intervals 4d in the vertical and horizontal directions, as in the color pattern in the sixth embodiment.

In the above-configured color pattern, if the pixel sampling rate in the vertical and horizontal directions is set to be the pixel pitch d, the sampling rate for the G pixels is d, and the sampling rate for the R and B pixels is 4d. That is, the R pixel or the B pixel is disposed in every other column (in this embodiment, odd-numbered rows) and every other row (in this embodiment, odd-numbered columns) so that the sampling rate for the R and B pixels in the vertical and horizontal directions becomes 1/4 the sampling rate for the G pixels. Accordingly, the resolution of the R and B pixels is 1/4 the resolution of the G pixels. In the 45° oblique direction, the sampling rate for the G pixels is $d/2\sqrt{2}$, and the sampling rate for the R and B pixels is $2d\sqrt{2}$.

Figure 25A:
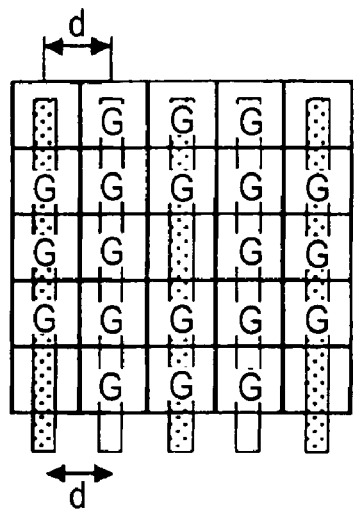
FIGS. 25A and 25B illustrate the G pattern from which only G pixels are extracted from the color pattern of the seventh embodiment.
Figure 25B:
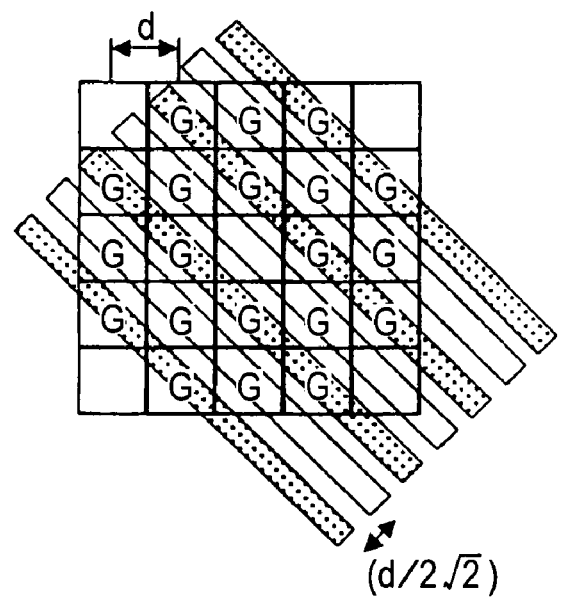

The G pattern from which only the G pixels are extracted from the color pattern shown in FIG. 24 is shown in FIGS. 25A and 25B. The spatial frequency characteristics of the G pixels are considered with reference to FIGS. 25A and 25B. In the vertical and horizontal directions, since the sampling rate of the G pixels is d, as shown in FIG. 25A, signal components having frequencies up to (1/2)fs (fs: sampling frequency) can be collected according to the sampling theorem. In the 45° oblique direction, since the sampling rate for the G pixels is $d/2\sqrt{2}$, as shown in FIG. 25B, signal components having frequencies up to $(1/\sqrt{2})fs$ can be collected according to the sampling theorem.

Similarly, the spatial frequency characteristics of the R and B pixels are considered below. In this case, since the pixel pitches for the R and B pixels are the same, only the spatial frequency characteristics of the R pixels are described below.

Figure 25C:
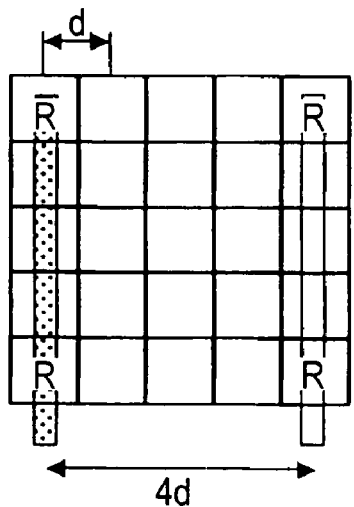
FIGS. 25C and 25D illustrate the R pattern from which only R pixels are extracted from the color pattern of the seventh embodiment.
Figure 25D:
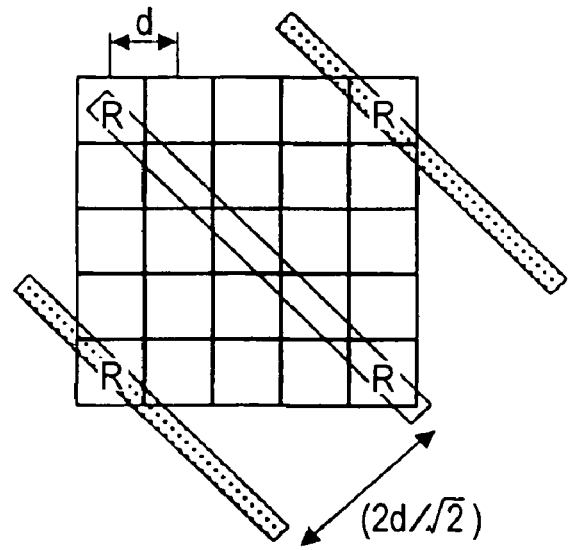

The R pattern from which only the R pixels are extracted from the pixel pattern shown in FIG. 24 is shown in FIGS. 25C and 25D. In FIGS. 25A through 25D, threshold frequency components that can be collected in the vertical, horizontal, and oblique directions are indicated by the voided columns and half-tone columns.

In the vertical and horizontal directions, since the sampling rate for the R pixels is 4d, as shown in FIG. 25C, signal components having frequencies up to 1/8 fs can be collected according to the sampling theorem. In the 45° oblique direction, since the sampling rate for the R pixels is $2d/\sqrt{2}$, as shown in FIG. 25D, signal components having frequencies up to $(1/4\sqrt{2})fs$ can be collected according to the sampling theorem.

Figure 26:
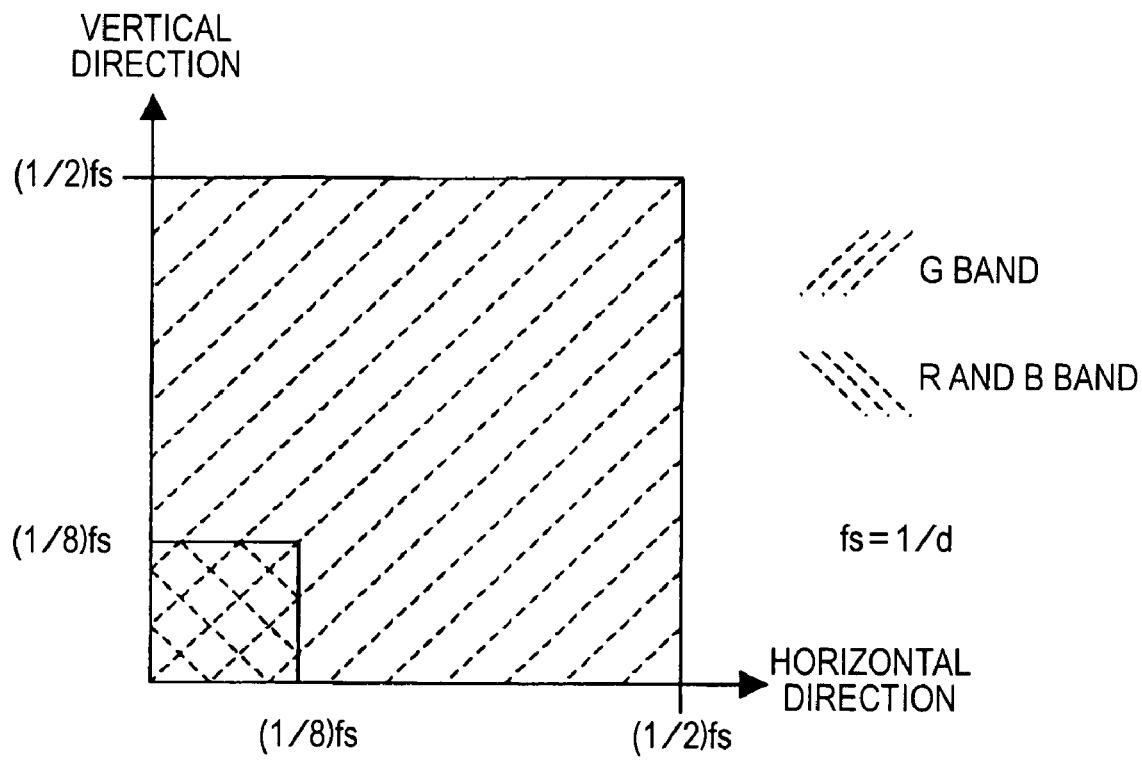
FIG. 26 illustrates the spatial frequency characteristics of the color pattern according to the seventh embodiment.

In accordance with the above-described points, the spatial frequency characteristics of the color pattern of the seventh embodiment are indicated in FIG. 26. Concerning the spatial frequency characteristics of the G pixels, in the vertical and horizontal directions, signal components having frequencies up to (1/2)fs can be collected, and in the oblique direction, signal components having frequencies up to $(1/\sqrt{2})fs$ can be collected. Concerning the spatial frequency characteristics of the R and B pixels, in the vertical and horizontal directions, signal components having frequencies up to (1/8)fs can be collected, and in the oblique direction, signal components having frequencies up to $(1/4\sqrt{2})fs$ can be collected.

Eighth Embodiment

Figure 27:
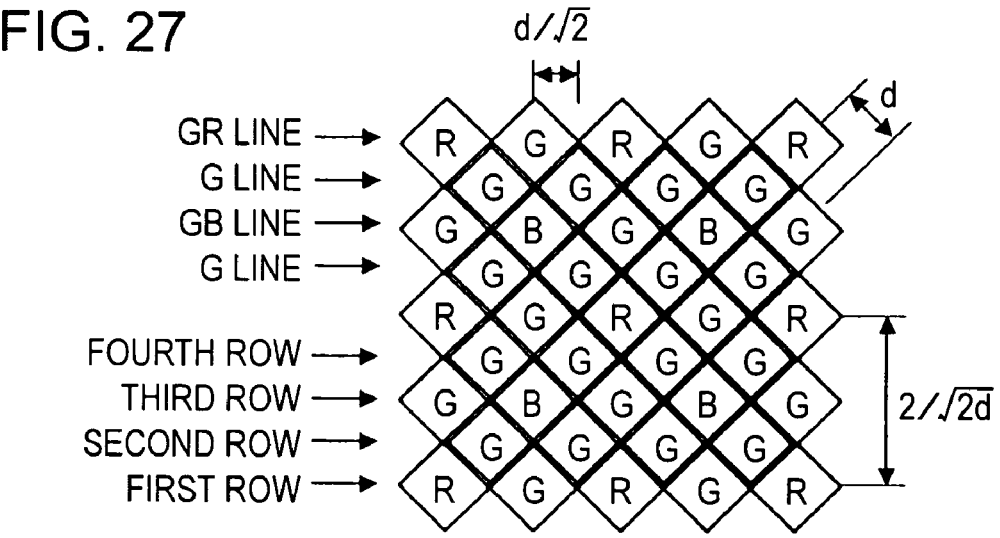
FIG. 27 illustrates the color pattern of a color filter according to an eighth embodiment of the present invention.

FIG. 27 illustrates the color pattern of a color filter according to an eighth embodiment of the present invention. A solid-state imaging apparatus using the color pattern according to this embodiment has, as shown in FIG. 27, a oblique pixel pattern in which the pixel pitch in the vertical and horizontal directions is set to be $\sqrt{2}d$ in contrast to the pixel pitch d of the square-lattice pixel pattern shown in FIG. 21 and even-numbered column pixels are displaced from odd-numbered column pixels in the row and column directions by about 1/2 the pixel pitch $\sqrt{2}d$. That is, in each row, pixels are disposed at $\sqrt{2}d$ pitches in the horizontal direction, and in each column, pixels are disposed at $\sqrt{2}d$ pitches in the vertical direction.

In the color pattern having this oblique pixel pattern, in the first row, G and R pixels are alternately disposed, in the second row, only G pixels are disposed, in the third row, B and G pixels are alternately disposed, and in the fourth row, only G pixels are disposed. Thereafter, those four rows are repeatedly disposed.

In the color pattern in this embodiment, as is seen from FIG. 27, the color components (G components in this embodiment), which are primary color components for generating luminance (Y) components, and other components (R and B components in this example) are disposed such that G components surround the R and B components. In this color pattern, R and B pixels are disposed at regular intervals $2\sqrt{2}d$ in the vertical and horizontal directions. This color pattern is equal to the pattern shifted from the color pattern in the square-lattice pixel pattern of the sixth embodiment shown in FIG. 21 by 45°.

In the above-configured color pattern, in the vertical and horizontal directions, the sampling rate for the G pixels is $d/\sqrt{2}$, and the sampling rate for the R and B pixels is $2\sqrt{2}d$. That is, the R pixel or the B pixel is disposed in every other column (in this embodiment, odd-numbered rows) and every other row (in this embodiment, odd-numbered columns) so that the sampling rate for the R and B pixels in the vertical and horizontal directions becomes 1/4 the sampling rate for the G pixels. Accordingly, the resolution of the R and B pixels is 1/4 the resolution of the G pixels. In the 45° oblique direction, the sampling rate for the G pixels is d, and the sampling rate for the R and B pixels is 2d.

Figure 28A:
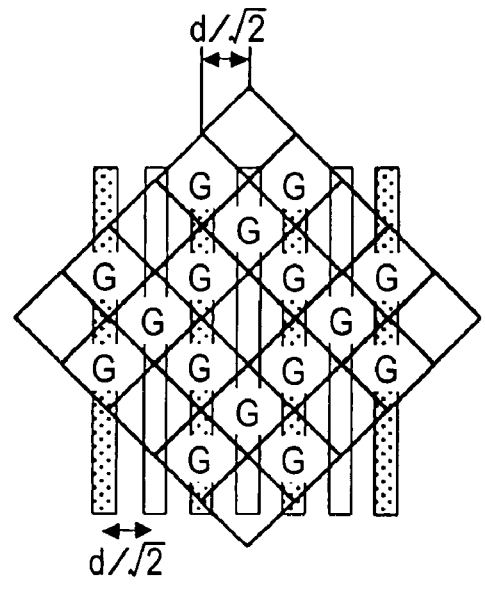
FIGS. 28A and 28B illustrate the G pattern from which only G pixels are extracted from the color pattern of the eighth embodiment.
Figure 28B:
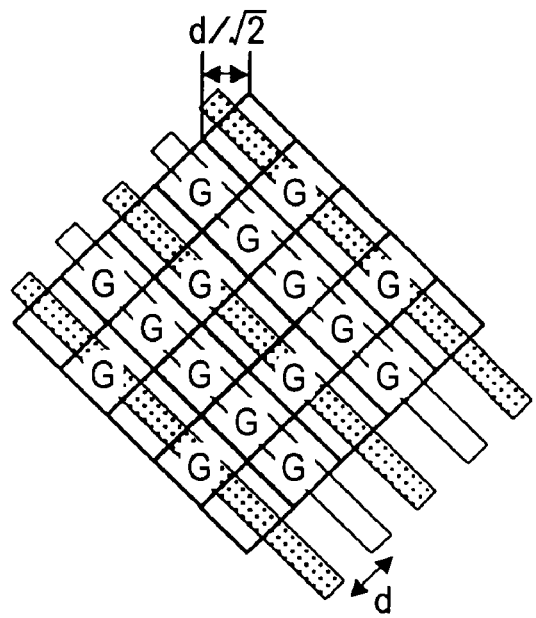

The G pattern from which only the G pixels are extracted from the color pattern shown in FIG. 27 is shown in FIGS. 28A and 28B. The spatial frequency characteristics of the G pixels are considered with reference to FIGS. 28A and 28B. In the vertical and horizontal directions, since the sampling rate of the G pixels is $d/\sqrt{2}$, as shown in FIG. 28A, signal components having frequencies up to $(1/\sqrt{2})fs$ (fs: sampling frequency) can be collected according to the sampling theorem. In the 45° oblique direction, since the sampling rate for the G pixels is d, as shown in FIG. 28B, signal components having frequencies up to (1/4)fs can be collected according to the sampling theorem.

Similarly, the spatial frequency characteristics of the R and B pixels are considered below. In this case, since the pixel pitches for the R and B pixels are the same, only the spatial frequency characteristics of the R pixels are described below.

Figure 28C:
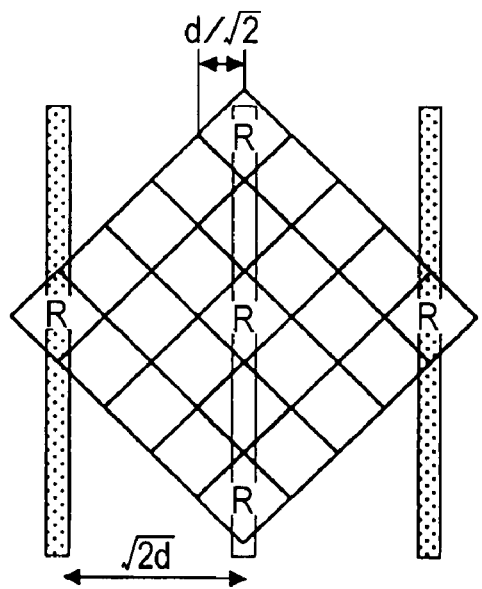
FIGS. 28C and 28D illustrate the R pattern from which only R pixels are extracted from the color pattern of the eighth embodiment.
Figure 28D:
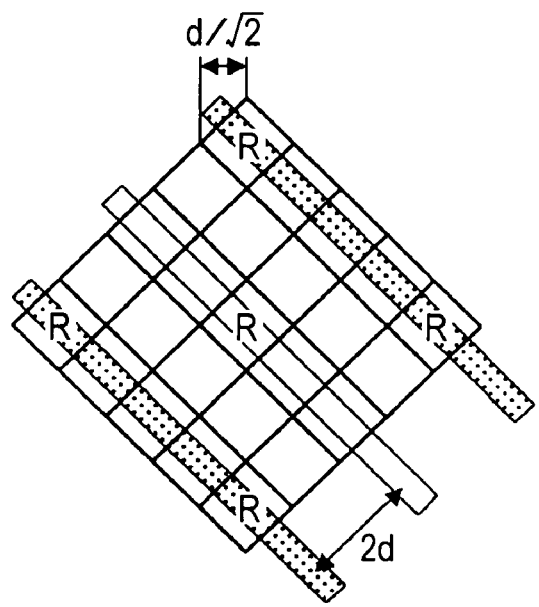

The R pattern from which only the R pixels are extracted form the pixel pattern shown in FIG. 27 is shown in FIGS. 28C and 28D. In FIGS. 28A through 28D, threshold frequency components that can be collected in the vertical, horizontal, and oblique directions are indicated by the voided columns and half-tone columns.

In the vertical and horizontal directions, since the sampling rate for the R pixels is 2d, as shown in FIG. 28C, signal components having frequencies up to $(1/4\sqrt{2})fs$ can be collected according to the sampling theorem. In the 45° oblique direction, since the sampling rate for the R pixels is 2d, as shown in FIG. 28D, signal components having frequencies up to (1/2)fs can be collected according to the sampling theorem.

Figure 29:
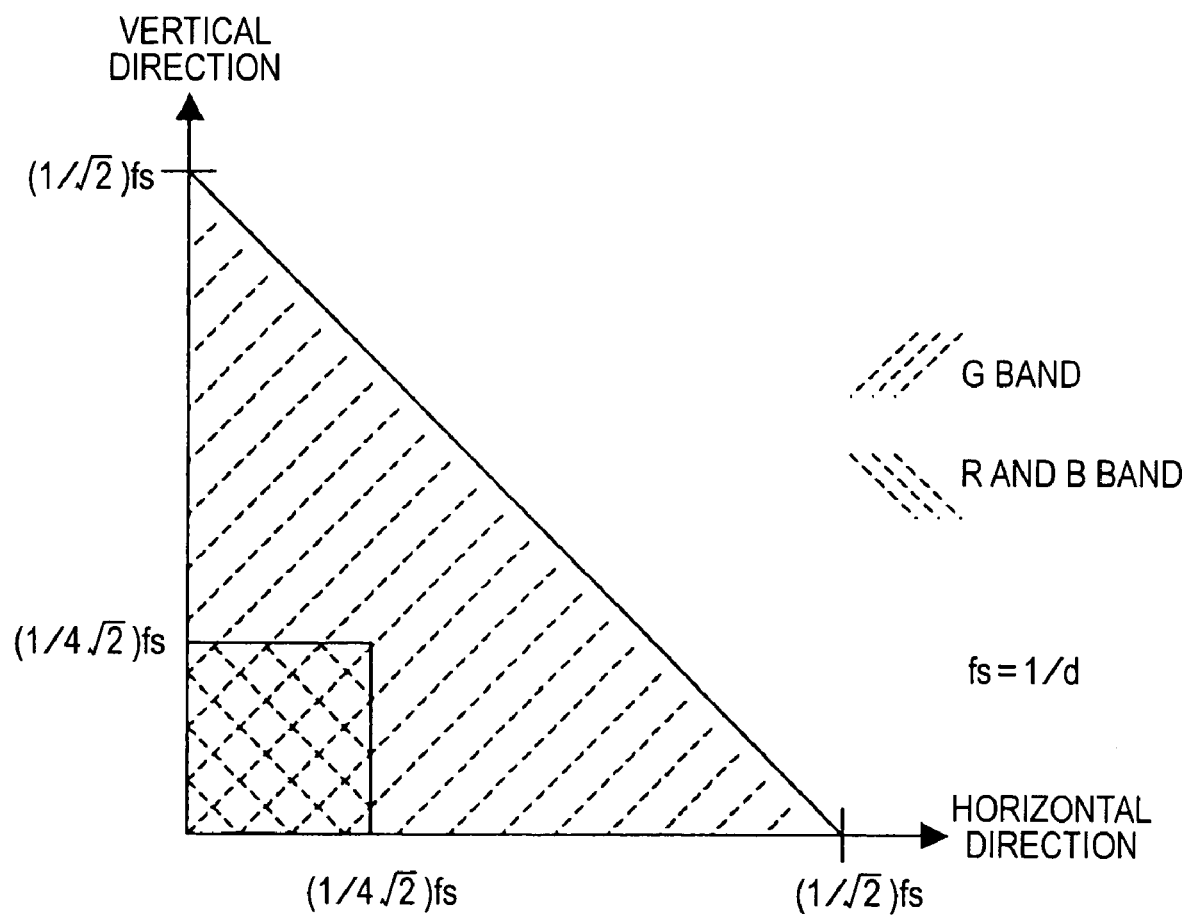
FIG. 29 illustrates the spatial frequency characteristics of the color pattern according to the eighth embodiment.

In accordance with the above-described points, the spatial frequency characteristics of the color pattern of the eighth embodiment are indicated in FIG. 29. Concerning the spatial frequency characteristics of the G pixels, in the vertical and horizontal directions, signal components having frequencies up to $(1/\sqrt{2})$fs can be collected, and in the oblique direction, signal components having frequencies up to $(1/4)$fs can be collected. Concerning the spatial frequency characteristics of the R and B pixels, in the vertical and horizontal directions, signal components having frequencies up to $(1/4\sqrt{2})$fs can be collected, and in the oblique direction, signal components having frequencies up to $(1/2)$fs can be collected.

In the above-described embodiments, the spatial frequency characteristics of the G pixels shown in FIGS. 23, 26, and 29 are theoretical frequency characteristics, assuming that a camera signal processing system (camera signal processing circuit 1014 shown in FIG. 20), which is discussed below, performs interpolation processing for interpolating G pixels at the R and B spatial positions.

Figure 30A:
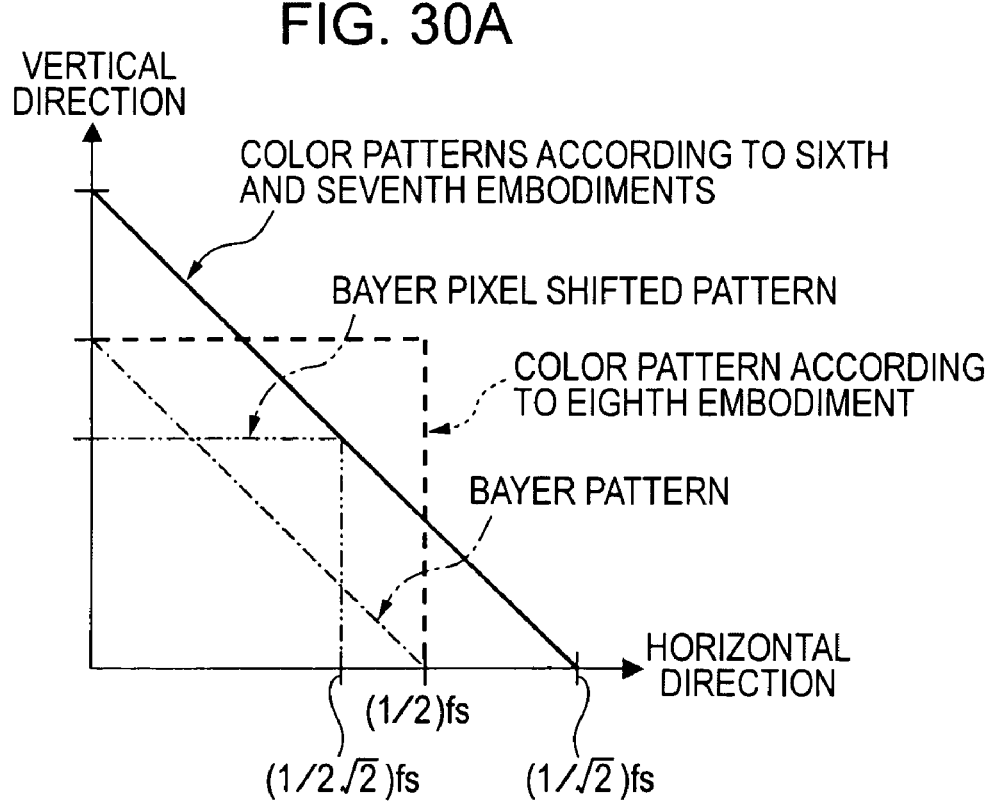
FIG. 30A illustrates the comparison result between the spatial frequency characteristics of the G pixels according to the sixth through eighth embodiments and those of known color patterns.

The comparison result between the spatial frequency characteristics (spatial resolution) of the G pixels of the color patterns according to the sixth through eighth embodiments and those of known color patterns (Bayer pattern and Bayer pixel shifted pattern) is shown in FIG. 30A. The comparison result between the spatial frequency characteristics (spatial resolution) of the R and B pixels of the color patterns according to the sixth through eighth embodiments and those of known color patterns (Bayer pattern and Bayer pixel shifted pattern) is shown in FIG. 30B.

FIG. 30A shows that the spatial frequency characteristics of the G pixels of the color patterns of the sixth and seventh embodiments in the 45° oblique direction are the same as those of the Bayer pixel shifted pattern, which are higher than those of the Bayer pattern, and that the spatial frequency characteristics of the G pixels of the color pattern of the sixth and seventh embodiments in the vertical and horizontal directions are higher than those of the Bayer pattern, which are higher than those of the Bayer pixel shifted pattern.

FIG. 30A also shows that the spatial frequency characteristics of the G pixels of the color pattern of the eighth embodiment in the vertical and horizontal directions are the same as those of the Bayer pattern, which are higher than those of the Bayer pixel shifted pattern, and that the spatial frequency characteristics of the G pixels of the eighth embodiment in the 45° oblique direction are higher than those of the Bayer pixel shifted pattern, which are higher than those of the Bayer pattern.

Figure 30B:
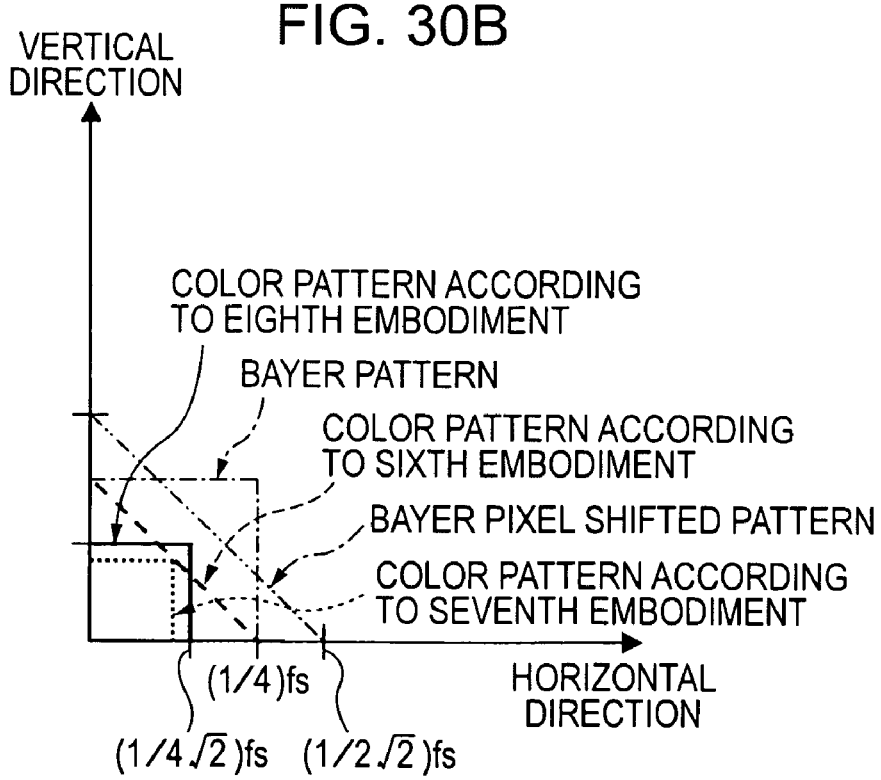
FIG. 30B illustrates the comparison result between the spatial frequency characteristics of the R and B pixels according to the sixth through eighth embodiments and those of known color patterns.

FIG. 30B shows that the spatial frequency characteristics of the R and B pixels of the color pattern of the sixth embodiment in the vertical and horizontal directions are the same as those of the Bayer pattern, which are lower than those of the Bayer pixel shifted pattern, and that the spatial frequency characteristics of the R and B pixels of the color pattern of the sixth embodiment in the 45° oblique direction are lower than those of the Bayer pixel shifted pattern, which are lower than those of the Bayer pattern.

FIG. 30B also shows that the spatial frequency characteristics of the R and B pixels of the color pattern of the seventh embodiment in the vertical and horizontal directions are lower than those of the Bayer pattern, which are lower than those of the Bayer pixel shifted pattern, and that the spatial frequency characteristics of the R and B pixels of the color pattern of the seventh embodiment in the 45° oblique direction are the same as those of the sixth embodiment.

FIG. 30B also shows that the spatial frequency characteristics of the R and B pixels of the color pattern of the eighth embodiment in the vertical and horizontal directions are lower than those of the Bayer pattern, which are lower than those of the Bayer pixel shifted pattern, and that the spatial frequency characteristics of the R and B pixels of the color pattern of the eighth embodiment in the 45° oblique direction are lower than those of the Bayer pixel shifted pattern.

Those comparison results reveal that the G pixels of the color patterns of the sixth and seventh embodiments in the vertical and horizontal directions and the G pixels of the color pattern of the eighth embodiment in the 45° oblique direction exhibit higher spatial frequency characteristics than those of the known color patterns (Bayer pattern and Bayer pixel shifted pattern). Since G pixels are primary pixels for generating luminance (Y) components, the higher spatial frequency characteristics of the G pixels greatly contribute to the improved resolution.

In contrast, the spatial frequency characteristics of the R and B pixels are lower than those of the known color patterns (Bayer pattern and Bayer pixel shifted pattern). As stated above, however, the human eye is less sensitive to the R and B colors, and thus, the lower characteristics of the R and B colors do not seriously influence the improved resolution.

As discussed above, in a solid-state imaging apparatus in which pixels including photoelectric transducers are two-dimensionally disposed in a matrix, and a color filter including G components, which are primary components for generating luminance (Y) components, and other R and B components is disposed on the surface of the pixels, a color filter is disposed such that the G pixels surround the R and B pixels. Accordingly, the G pixels are disposed in all the rows and all the columns of the color filter, thereby increasing the spatial frequency characteristics (spatial resolution) of the G components having higher sensitivity for the human eye.

More specifically, the resolution of the G pixels in the vertical and horizontal directions is higher than or equivalent to that of the Bayer pattern, which is higher than the Bayer pixel shifted pattern, and the resolution of the G pixels in the 45° oblique direction is higher than or equivalent to that of the Bayer pixel shifted pattern, which is higher than the Bayer pattern. As a result, higher resolution can be exhibited, not only for achromatic subjects, but also for chromatic subjects.

Additionally, unlike the known Bayer pixel shifted pattern, it is not necessary to adjust the RGB balance in a camera signal processing system, which is discussed below, to overcome lower resolution of the G pixels, thereby preventing the occurrence of false colors caused by a deviation in the level balance.

In particular, in the color pattern in the sixth embodiment, the R and B pixels are disposed in every other row and every other column so that the sampling rate of the R and B pixels in the vertical and horizontal directions becomes 1/2 the sampling rate of the G pixels. Accordingly, the resolution of the G pixels in the vertical and horizontal directions is higher than that of the Bayer pattern, which is higher than the Bayer pixel shifted pattern, and the resolution of the G pixels in the 45° oblique direction is comparable to that of the Bayer pixel shifted pattern, which is higher than that of the Bayer pattern.

In the color pattern in the seventh embodiment, the R and B pixels are disposed in every other row and every other column so that the sampling rate of the R and B pixels in the vertical and horizontal directions becomes 1/4 the sampling rate of the G pixels. Accordingly, as in the color pattern of the sixth embodiment, the resolution of the G pixels in the vertical and horizontal directions is higher than that of the Bayer pattern, which is higher than the Bayer pixel shifted pattern, and the resolution of the G pixels in the 45° oblique direction is comparable to that of the Bayer pixel shifted pattern, which is higher than that of the Bayer pattern.

In the color pattern in the eighth embodiment, in the oblique pixel pattern in which the even-numbered pixels are displaced from the odd-numbered pixels in the row and column directions by 1/2 the pixel pitch, the R and B pixels are disposed in every other row and every other column so that the sampling rate of the R and B pixels in the vertical and horizontal directions becomes 1/4 the sampling rate of the G pixels. Accordingly, as in the color pattern of the eighth embodiment, the resolution of the G pixels in the vertical and horizontal directions is comparable to that of the Bayer pattern, which is higher than the Bayer pixel shifted pattern, and the resolution of the G pixels in the oblique 45° direction is twice as high as that of the Bayer pattern.

In particular, in the color pattern of the eighth embodiment having an oblique pixel pattern, the sampling rate is $1/\sqrt{2}$ times as large as that of the Bayer pattern. Accordingly, pixel information twice as much as that of the square-lattice pixel pattern can be obtained, i.e., higher resolution can be obtained compared to the square-lattice pixel pattern. If the same resolution as that of the square-lattice pixel pattern is required, the pixels can be disposed at wider pitches. As a result, the pixel aperture can be increased so that the photo-sensitivity of the pixels can be enhanced, thereby obtaining signals having a high S/N ratio.

In the color pattern of the sixth embodiment, FIG. 23 shows that the spatial frequency characteristics of the R and B pixels are 1/2 of those of the G pixels in the vertical and horizontal directions, and are 1/4 of those of the G pixels in the 45° oblique direction. In the color pattern of the seventh embodiment, FIG. 26 shows that the spatial frequency characteristics of the R and B pixels are 1/4 of those of the G pixels in the vertical and horizontal directions, and are 1/4 of those of the G pixels in the 45°oblique direction. In the color pattern of the eighth embodiment, FIG. 29 shows that the spatial frequency characteristics of the R and B pixels are 1/4 of those of the G pixels in the vertical and horizontal directions, and are 1/2 of those of the G pixels in the 45° oblique direction.

However, the human visibility characteristics prove that it is easy for the human eye to recognize high luminance resolution and difficult to recognize high color resolution. Accordingly, the above-described spatial frequency characteristics of the R and B pixels are sufficient.

For example, in a general television signal format, the band of the chrominance (C) signal is 1/4 the band of the luminance (Y) signal, which is sufficient for the color resolution. The color patterns of the sixth through eighth embodiments make the best use of that characteristic.

That is, according to the color patterns of the sixth through eighth embodiments, the color spatial frequency characteristics are reduced to a minimal level which does not produce a sense of artificiality for the human eye, and instead, the luminance spatial frequency characteristics are considerably enhanced compared to known color patterns.

Additionally, in the color patterns of the sixth through eighth embodiments, G pixels are disposed in all the rows and all the columns. This greatly contributes to increased interpolation precision when performing interpolation processing for interpolating G pixels at the R and B spatial positions in a camera signal processing system, which is discussed below.

Solid-state imaging apparatuses including color filters having the color patterns of the sixth through eighth embodiments are suitably used as imaging apparatuses, such as digital still cameras and video cameras, in particular, as imaging devices in video cameras.

Imaging Apparatus

Figure 20:
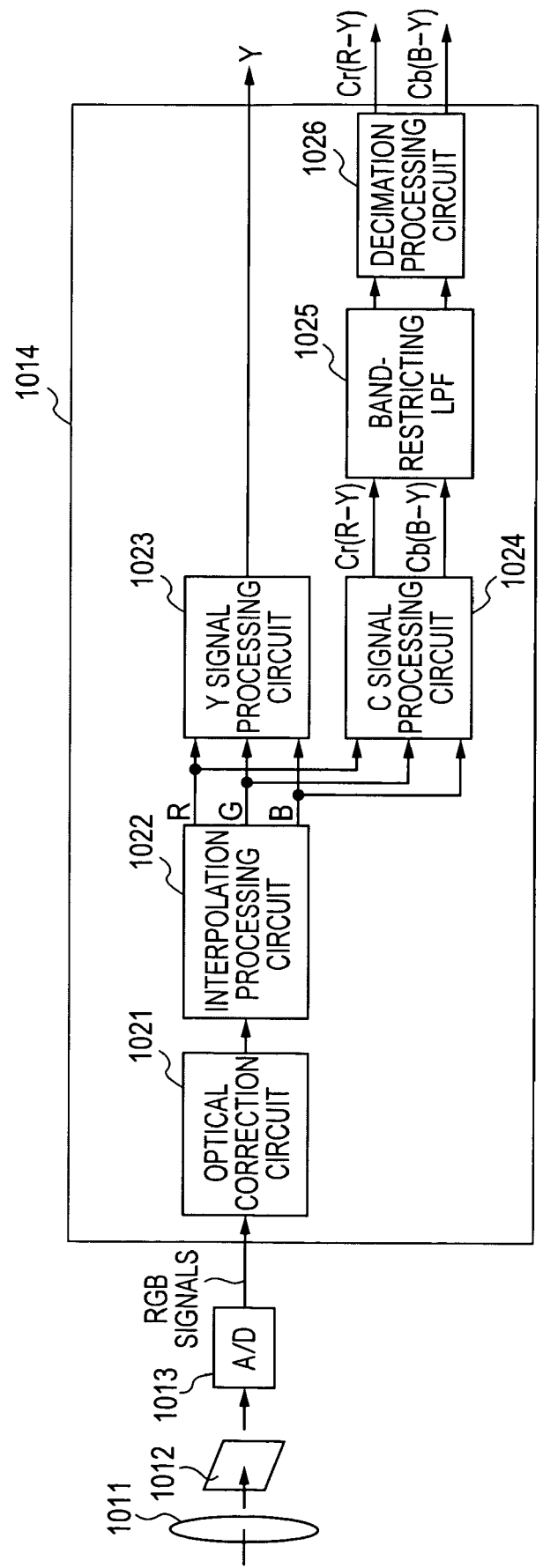
FIG. 20 is a block diagram illustrating an example of the configuration of an imaging apparatus according to an embodiment of the present invention.

FIG. 20 is a block diagram illustrating an example of the configuration of an imaging apparatus according to an embodiment of the present invention. In FIG. 20, an optical system, such as a lens 1011, forms an image corresponding to light reflected by a subject (not shown) on the imaging plane of an imaging device 1012. As the imaging device 1012, a solid-state imaging apparatus in which pixels including photoelectric transducers are two-dimensionally disposed and a color filter having color components, which are primary components for generating luminance components, and other color components is disposed on the surface of the pixels is used. In this case, a color filter having the color pattern according to the sixth, seventh, or eighth embodiment is used.

The imaging apparatus shown in FIG. 20 includes the lens 1011, the imaging device (solid-state imaging device) 1012, an analog-to-digital (A/D) converter 1013, and the camera signal processing circuit 1014. The camera signal processing circuit 1014 includes an optical system correction circuit 1021, an interpolation processing circuit 1022, a luminance (Y) signal processing circuit 1023, a chromatic (C) signal processing circuit 1024, a band-restricting low-pass filter (LPF) 1025, and a decimation processing circuit 1026.

Among the light incident on the imaging device 1012, only the light components corresponding to the color components of the color filter pass through the color filter and are incident on the pixels. Then, the light incident on the pixels is converted into an electric signal by the photoelectric transducers, such as photodiodes, and is read as an analog signal. The analog signal is then converted into a digital signal by the A/D converter 1013, and the digital signal is input into the camera signal processing circuit 1014.

The optical system correction circuit 1021 performs correction for the sensors or the optical system, such as defect correction for correcting digital clamp for the adjustment of the black level or for correcting the imaging device 1012 for defects, and shading correction for correcting the lens 1011 for the marginal illumination eclipse.

The interpolation processing circuit 1022 generates three plane signals from the RGB signals which are spatially out of phase with each other to create RGB signals having the same spatial position, and supplies the RGB signals to the Y signal processing circuit 1023 and the C signal processing circuit 1024. The Y signal processing circuit 1023 generates a luminance (Y) signal according to the above-described equation (1). The C signal processing circuit 1024 generates color difference signals Cr(R−Y) and Cb(B−Y) according to equation (2).

$$Cr=(R-Y)=R-(0.3R+0.6G+0.1B)$$

$$Cb=(B-Y)=B-(0.3R+0.6G+0.1B) \qquad (2)$$

Figure 31:
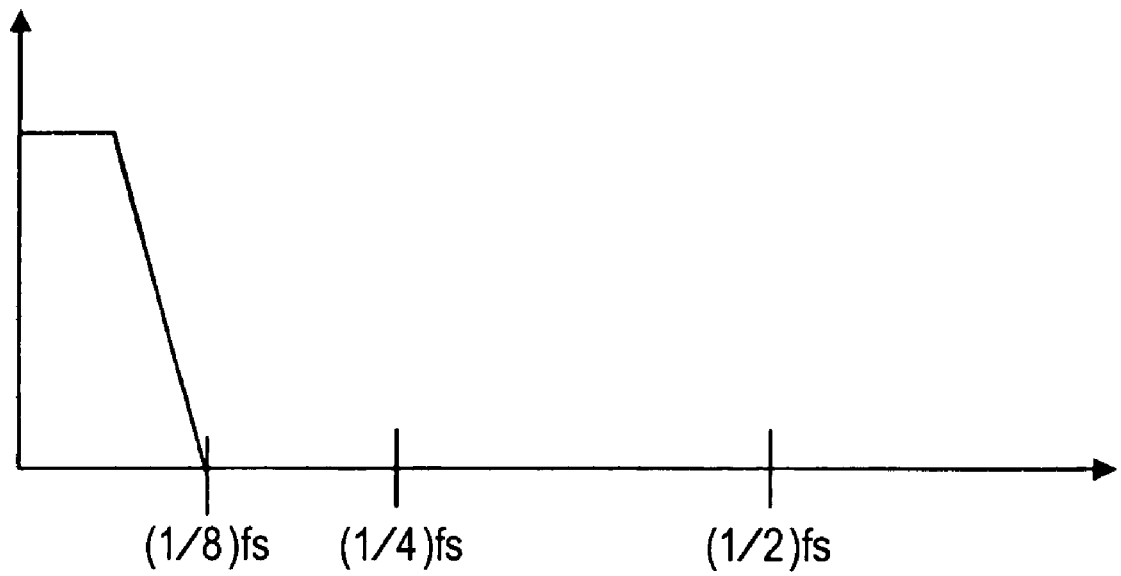
FIG. 31 illustrates the characteristic of a band-restricting low-pass filter (LPF)
Figure 32:
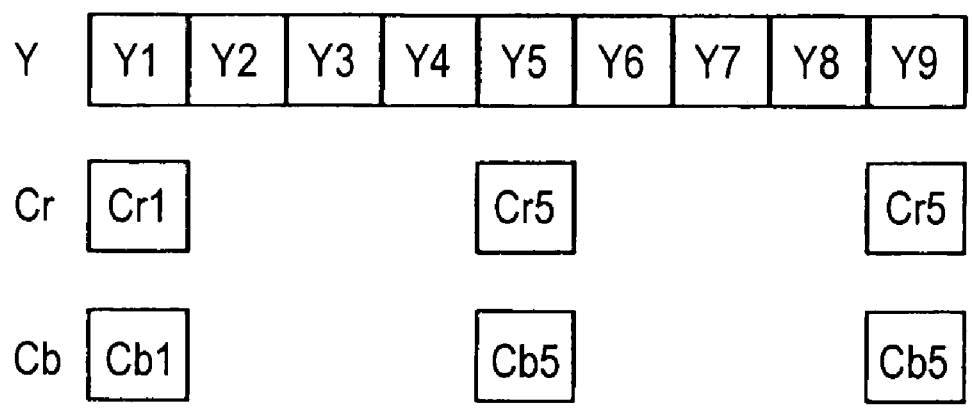
FIG. 32 illustrates the concept of decimation processing.

The band-restricting LPF 1025 is a filter having a cutoff frequency, as shown in FIG. 31, which is equal to 1/8 the sampling frequency fs, and drops the Cr and Cb color difference signals having a frequency range of (1/2)fs to (1/8)fs. The Cr and Cb color difference signals of the band-restricting LPF 1025 are output in accordance with the television signal format. If the Cr and Cb color difference signals are output without performing band restriction, frequency signals having 1/8 fs or higher are output as false signals. The decimation processing circuit 1026 decimates the Cr and Cb color difference signals, as shown in FIG. 32.

The reason for decimating the Cr and Cb color difference signals is that the Cr and Cb color difference signals need only 1/4 the band of the luminance (Y) signals. This is determined by the television signal format, and also because it is easy for the human eye to recognize high-frequency luminance (Y) signals but it is difficult to recognize high-frequency chrominance (C) signals.

When observing the difference between Y:Cr:Cb=4:4:4 (the output bands of the Y and C signals are the same) and Y:Cr:Cb=4:1:1 as the output images, it is difficult to identify the difference in the output images of subjects other than special subjects, for example, subjects using red or blue point light sources. That is, a sufficient level of resolution can be obtained if the C signals have 1/4 the band of the Y signal, as determined by the television signal format.

This means that the color pattern according to the sixth, seventh, or eighth embodiment can be used as the color filter pattern of the color filter, which serves as the imaging device 1012, for the solid-state imaging apparatus.

More specifically, the spatial frequencies of the R and B color components, which are color components other than the G color components, which are the primary color components for generating luminance components, are as follows. In the color pattern of the sixth embodiment, the spatial frequencies of the R and B color components are 1/2 in the vertical and horizontal directions and 1/4 in the 45° direction, as shown in FIG. 23. In the color pattern of the seventh embodiment, the spatial frequencies of the R and B color components are 1/4 in the vertical and horizontal directions and 1/4 in the 45° direction, as shown in FIG. 26. In the color pattern of the eighth embodiment, the spatial frequencies of the R and B color components are 1/4 in the vertical and horizontal directions and 1/2 in the 45° direction, as shown in FIG. 29. Accordingly, any of the color patterns satisfies the condition of Y:Cr:Cb = 4:1:1.

As described above, by using the color pattern of the sixth, seventh, or eighth embodiment as the imaging device 1012 for an imaging apparatus, such as a digital still camera or a video camera, in particular, a video camera, the spatial frequency characteristics (spatial resolution) of the G components having high sensitivity for the human eye can be increased. As a result, high luminance resolution not only for achromatic subjects, but also for chromatic subjects, can be obtained.

Additionally, unlike the known Bayer pixel shifted pattern, it is not necessary to adjust the level balance of RGB pixels in the camera signal processing circuit 1014 to overcome lower resolution of the G pixels. Accordingly, the circuit operation can be simplified, and the occurrence of false colors caused by a deviation in the level balance can be prevented.

In any of the color patterns of the sixth, seventh, and eighth embodiments, the G pixels surround the R and B pixels. Accordingly, since the G pixels are disposed in all the rows and all the columns, the interpolation precision when interpolating the G pixels at the R and B spatial positions in the interpolation processing circuit 1022 in the camera signal processing circuit 1014 is considerably improved.

It should be understood by those skilled in the art that various modifications, combinations, sub-combinations and alterations may occur depending on design requirements and other factors insofar as they are within the scope of the appended claims or the equivalents thereof.

What is claimed is:

1. A drive method for a solid-state imaging device having an oblique pixel pattern in which pixels are obliquely disposed, comprising the steps of:
   adding, separately for an odd-numbered row and an even-numbered row, x pixels in the horizontal direction and y pixels in the vertical direction, the x pixels and the y pixels having an identical color, in an area having adjacent n pixels in the horizontal direction and adjacent n pixels in the vertical direction, where n is an odd number of three or greater and n≧x≧y; and
   repeatedly adding the x pixels in the horizontal direction and the y pixels in the vertical direction while shifting the area having the adjacent n pixels in the horizontal direction and the adjacent n pixels in the vertical direction by m pixels in the vertical or horizontal direction, where m is an odd number of three or greater, a spatial positional relationship between the area having the adjacent n pixels in the horizontal direction and the adjacent n pixels in the vertical direction of odd-numbered rows and the area having the adjacent n pixels in the horizontal direction and the adjacent n pixels in the vertical direction of even-numbered rows being such that they are displaced from each other by m pixels in an oblique direction in the oblique pixel pattern.

2. The drive method according to claim 1, wherein an odd-numbered row and an even-numbered row which are not adjacent to each other are simultaneously selected for a plurality of times during one horizontal blanking period.

3. The drive method according to claim 2, wherein signals of the pixels of the odd-numbered rows output via an odd-numbered row vertical signal line group including odd-numbered row vertical signal lines, each of which is connected to a corresponding column of odd-numbered row pixels, are added between columns of the oblique pixel pattern, and signals of the pixels of the even-numbered rows output via an even-numbered row vertical signal line group including even-numbered row vertical signal lines, each of which is connected to a corresponding column of even-numbered row pixels, are added between columns of the oblique pixel pattern, and
   the odd-numbered rows and the even-numbered rows are selected such that a column number corresponding to the added signal of the odd-numbered rows does not coincide with a column number corresponding to the added signal of the even-numbered rows.

4. An imaging apparatus comprising:
   a solid-state imaging device having an oblique pixel pattern in which pixels are obliquely disposed, in an area having adjacent n pixels in the horizontal direction and adjacent n pixels in the vertical direction, x pixels in the horizontal direction and y pixels in the vertical direction are repeatedly added separately for an odd-numbered row and an even-numbered row of the oblique pixel pattern while shifting the area having the adjacent n pixels in the horizontal direction and the adjacent n pixels in the vertical direction by m pixels in the vertical or horizontal direction, the x pixels and the y pixels having an identical color, where n is an odd number of three or greater, m is an odd number of three or greater, and n≧x≧y, a spatial positional relationship between the area having the adjacent n pixels in the horizontal direction and the adjacent n pixels in the vertical direction of odd-numbered rows and the area having the adjacent n pixels in the horizontal direction and the adjacent n pixels in the vertical direction of even-numbered rows being such that they are displaced from each other by m pixels in an oblique direction in the oblique pixel pattern;
   mode setting means for selectively setting a progressive read mode for independently reading signals of all pixels in the oblique pixel pattern and a pixel addition read mode for adding pixels in the oblique pixel pattern; and
   drive means for driving the solid-state imaging device according to the progressive read mode or the pixel addition read mode set by the mode setting means.

5. The imaging apparatus according to claim 4, wherein in the pixel addition read mode, the drive means simultaneously drives an odd-numbered row and an even-numbered row of the solid-state imaging device which are not adjacent to each other for a plurality of times during one horizontal blanking period.

6. The imaging apparatus according to claim 5, wherein, in the pixel addition read mode, the drive means drives the solid-state imaging device such that signals of the pixels of the odd-numbered rows output via an odd-numbered row vertical signal line group including odd-numbered row vertical signal lines, each of which is connected to a corresponding column of the odd-numbered row pixels in the oblique pixel pattern, are added between columns of the oblique pixel pattern, and signals of the pixels of the even-numbered rows output via an even-numbered row vertical signal line group including even-numbered row vertical signal lines, each of which is connected to a corresponding column of the even-numbered row pixels, are added between columns of the oblique pixel pattern, and such that column numbers corresponding to the added signal of a selected odd-numbered row do not coincide with column numbers corresponding to the added signal of a selected even-numbered row.

7. An imaging apparatus comprising:
a solid-state imaging device having an oblique pixel pattern in which pixels are obliquely disposed, in an area having adjacent n pixels in the horizontal direction and adjacent n pixels in the vertical direction, x pixels in the horizontal direction and y pixels in the vertical direction are repeatedly added separately for an odd-numbered row and an even-numbered row of the oblique pixel pattern while shifting the area having the adjacent n pixels in the horizontal direction and the adjacent n pixels in the vertical direction by m pixels in the vertical or horizontal direction, the x pixels and the y pixels having an identical color, where n is an odd number of three or greater, m is an odd number of three or greater, and $n \geq x \geq y$, a spatial positional relationship between the area having the adjacent n pixels in the horizontal direction and the adjacent n pixels in the vertical direction of odd-numbered rows and the area having the adjacent n pixels in the horizontal direction and the adjacent n pixels in the vertical direction of even-numbered rows being such that they are displaced from each other by m pixels in an oblique direction in the oblique pixel pattern;
a mode setting unit configured to selectively set a progressive read mode for independently reading signals of all pixels in the oblique pixel pattern and a pixel addition read mode for adding pixels in the oblique pixel pattern; and
a drive unit configured to drive the solid-state imaging device according to the progressive read mode or the pixel addition read mode set by the mode setting unit.

* * * * *